United States Patent
Xu et al.

(10) Patent No.: US 11,677,477 B2
(45) Date of Patent: *Jun. 13, 2023

(54) DECISION DIRECTED MULTI-MODULUS SEARCHING ALGORITHM

(71) Applicant: CABLE TELEVISION LABORATORIES, INC., Louisville, CO (US)

(72) Inventors: Mu Xu, Broomfield, CO (US); Zhensheng Jia, Superior, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 17/498,232

(22) Filed: Oct. 11, 2021

(65) Prior Publication Data

US 2022/0029708 A1 Jan. 27, 2022

Related U.S. Application Data

(63) Continuation of application No. 16/510,486, filed on Jul. 12, 2019, now Pat. No. 11,146,338.

(60) Provisional application No. 62/671,257, filed on May 14, 2018.

(51) Int. Cl.
*H04B 10/61* (2013.01)
*H04B 10/2575* (2013.01)
*H04L 1/00* (2006.01)

(52) U.S. Cl.
CPC ....... *H04B 10/616* (2013.01); *H04B 10/2575* (2013.01); *H04L 1/0036* (2013.01)

(58) Field of Classification Search
CPC ...... H04B 10/616; H04B 10/60; H04B 10/61; H04B 10/2575; H04B 10/40; H04B 10/6165; H04B 10/6971; H04L 1/0036; H04L 25/03019; G06F 7/08; G06F 2207/4824; G06F 7/14
USPC ................. 398/202, 208, 140, 149, 135, 211
See application file for complete search history.

(56) References Cited

U.S. PATENT DOCUMENTS

| 4,868,867 | A * | 9/1989 | Davidson | G10L 19/10 704/223 |
| 8,065,379 | B1 * | 11/2011 | Musat | G06Q 10/107 709/200 |
| 2009/0298424 | A1 * | 12/2009 | Liu | H04B 7/0639 455/39 |
| 2016/0277121 | A1 * | 9/2016 | Millar | H04L 1/0036 |

* cited by examiner

*Primary Examiner* — Hibret A Woldekidan
(74) *Attorney, Agent, or Firm* — Josh Snider

(57) ABSTRACT

Methods, systems, and devices for a decision directed multi-modulus searching algorithm are described. A receiver may receive a signal including a set of data symbols. The receiver may iteratively determine a set of centroids for demodulating the set of data symbols (e.g., as part of a training procedure). The centroids may be used to demodulate the set of data symbols according to a modulation constellation associated with the set of data symbols. The training procedure may include, for each data symbol of a subset of data symbols, assigning a centroid of the set of centroids to each data symbol and updating the set of centroids based on assigning the centroid to each data symbol. The receiver may demodulate the set of data symbols based on the updated set of centroids.

10 Claims, 13 Drawing Sheets

DECISION DIRECTED MULTI-MODULUS SEARCHING ALGORITHM

CROSS REFERENCES

The present application is a continuation of U.S. patent application Ser. No. 16/510,486, filed Jul. 12, 2019, which application claims the benefit of U.S. Provisional Patent Application No. 62/671,257 by Xu et al., entitled "DECISION DIRECTED MULTI-MODULUS SEARCHING ALGORITHM," filed May 14, 2018, assigned to the assignee hereof, and expressly incorporated herein by reference in its entirety.

BACKGROUND

A system may be configured to communicate over various networks comprised of various network links, including ethernet, Wi-Fi, Long Term Evolution (LTE), and/or cable (e.g., a fiber optic network). Communications over the various networks may be based on signals transmitted between devices, the signals including sets of data symbols. A receiving device may be configured to demodulate a set of data symbols according to a modulation constellation associated with the data symbols.

SUMMARY

A system may include various network devices communicating with one another over any appropriate network (e.g., ethernet, Wi-Fi, Long Term Evolution (LTE), 3G, 4G, 5G, 6G, a data over cable service interface specification (DOCSIS) network, a fiber optic network (such as but not limited to a passive optical network (PON), a composite PON (CPON), an ethernet PON (EPON), a gigabit PON (GPON), a radio frequency over glass (RFOG) network, etc.), or any other combination thereof). Network devices may communicate information over the appropriate networks using a modulation scheme, for example a quadrature amplitude modulation (QAM) scheme. A receiving device may receive the signal and blindly perform coherent digital signal processing (DSP) in order to recover the signal. The DSP algorithm may include determining a set of centroids associated with the received signal and classifying each data symbol of the received signal according to the set of centroids. In some cases, the set of centroids may be static, or preconfigured. However, the signal may include nonlinear distortions (e.g., incurred by electrical amplification, nonlinearities of a fiber optic network). According to various aspects, the DSP algorithm may implement a feedback loop to determine and update the set of centroids based on the received signal.

The receiving device may receive the signal (e.g., an optical signal via a fiber optic network) and perform a training procedure to determine the set of centroids. The training procedure may include assigning a centroid (e.g., of an initial set of centroids) to a first data symbol within the signal and then updating the initial set of centroids based on the first data symbol. The receiving device may then assign a centroid (e.g., of the updated initial set of centroids) to a second data symbol within the signal and then update the initial set of centroids again. The receiving device may continue to iteratively update the set of centroids based on assigning a centroid to a data symbol for the duration of the training procedure. Once the training procedure is completed, the receiving device may assign centroids to each of the data symbols within the signal and demodulate the signal based on the assigned centroids. By implementing the feedback loop during the training procedure, the DSP algorithm may decrease the effects of nonlinear distortions on the signal to increase the accuracy and reliability of communications within the system.

A method is described. The method may include receiving, from a transmitter, an optical signal including a set of data symbols, iteratively determining a set of centroids for demodulating the set of data symbols according to a modulation constellation associated with the set of data symbols. Iteratively determining may include, for each data symbol of at least a subset of the set of data symbols, assigning a centroid of the set of centroids to the each data symbol of at least the subset of the set of data symbols, and updating one or more of the set of centroids based on the assigning the centroid to the each data symbol of at least the subset of the set of data symbols. The method may further include demodulating the set of data symbols based on the updated set of centroids.

An apparatus is described. The apparatus may include a processor, memory in electronic communication with the processor, and instructions stored in the memory. The instructions may be executable by the processor to cause the apparatus to receive, from a transmitter, an optical signal including a set of data symbols, iteratively determine a set of centroids for demodulating the set of data symbols according to a modulation constellation associated with the set of data symbols. Iteratively determining may include, for each data symbol of at least a subset of the set of data symbols, assigning a centroid of the set of centroids to the each data symbol of at least the subset of the set of data symbols, and updating one or more of the set of centroids based on the assigning the centroid to the each data symbol of at least the subset of the set of data symbols. The instructions may be further executable by the processor to cause the apparatus to demodulate the set of data symbols based on the updated set of centroids.

Another apparatus is described. The apparatus may include means for receiving, from a transmitter, an optical signal including a set of data symbols, means for iteratively determining a set of centroids for demodulating the set of data symbols according to a modulation constellation associated with the set of data symbols. Iteratively determining may include, for each data symbol of at least a subset of the set of data symbols, assigning a centroid of the set of centroids to the each data symbol of at least the subset of the set of data symbols, and updating one or more of the set of centroids based on the assigning the centroid to the each data symbol of at least the subset of the set of data symbols. The apparatus may further include means for demodulating the set of data symbols based on the updated set of centroids.

A non-transitory computer-readable medium storing code is described. The code may include instructions executable by a processor to receive, from a transmitter, an optical signal including a set of data symbols, iteratively determine a set of centroids for demodulating the set of data symbols according to a modulation constellation associated with the set of data symbols. Iteratively determining may include, for each data symbol of at least a subset of the set of data symbols, assigning a centroid of the set of centroids to the each data symbol of at least the subset of the set of data symbols, and updating one or more of the set of centroids based on the assigning the centroid to the each data symbol of at least the subset of the set of data symbols. The code may further include instructions executable by the processor to demodulate the set of data symbols based on the updated set of centroids.

Some examples of the method, apparatuses, and non-transitory computer-readable medium described herein may further include operations, features, means, or instructions for receiving an indication of initial values for the set of centroids prior to receiving the optical signal, where the assigning the centroid may be based on the initial values for the set of centroids for one or more of the at least the subset of the set of data symbols.

Some instances of the method, apparatuses, and non-transitory computer-readable medium described herein may further include operations, features, means, or instructions for determining initial values for the set of centroids prior to the iteratively determining, where determining the initial values may be based on a value of a randomly selected data symbol of the set of data symbols.

Some cases of the method, apparatuses, and non-transitory computer-readable medium described herein may further include operations, features, means, or instructions for determining distance metrics between a radius of the each data symbol and at least a subset of the set of centroids, where the assigning the each data symbol of the at least the subset of the set of data symbols to the centroid of the set of centroids may be based on the determining the distance metrics.

In some examples of the method, apparatuses, and non-transitory computer-readable medium described herein, the distance metrics include a minimum of a set of Euclidean distances between the radius of the each data symbol and the at least the subset of the set of centroids.

In some instances of the method, apparatuses, and non-transitory computer-readable medium described herein, the updating the one or more of the set of centroids may include operations, features, means, or instructions for determining an updated centroid for the one or more of the set of centroids based on a function of radii of data symbols assigned to the one or more of the set of centroids.

In some cases of the method, apparatuses, and non-transitory computer-readable medium described herein, the function includes a minimizing function of Euclidean distances between the data symbols assigned to the one or more of the set of centroids and the updated centroid.

Some instances of the method, apparatuses, and non-transitory computer-readable medium described herein may further include operations, features, means, or instructions for determining that a difference between the set of centroids and the updated set of centroids exceeds a threshold, and transmitting an indication to the transmitter that the difference between the set of centroids and the updated set of centroids exceeds the threshold.

Some examples of the method, apparatuses, and non-transitory computer-readable medium described herein may further include operations, features, means, or instructions for assigning one centroid of the updated set of centroids to each data symbol of a second subset of the set of data symbols after iteratively determining the set of centroids, where the second subset of the set of data symbols may be different than the subset of the set of data symbols.

Some cases of the method, apparatuses, and non-transitory computer-readable medium described herein may further include operations, features, means, or instructions for iteratively determining, after assigning the centroid of the updated set of centroids to each data symbol of the second subset of the set of data symbols, a second set of centroids for demodulating a second set of data symbols of a second optical signal, where the iteratively determining the second set of centroids may be based on the updated set of centroids, and demodulating the second set of data symbols based on the second set of centroids.

Some examples of the method, apparatuses, and non-transitory computer-readable medium described herein may further include operations, features, means, or instructions for determining that a signal to noise ratio associated with the optical signal exceeds a noise threshold, where the iteratively determining the second set of centroids may be based on the determining that the signal to noise ratio exceeds the noise threshold.

Some instances of the method, apparatuses, and non-transitory computer-readable medium described herein may further include operations, features, means, or instructions for detecting a quantity of mean square errors associated with the set of data symbols based on demodulating the set of data symbols, and determining that the quantity of mean square errors exceeds an error threshold, where the iteratively determining the second set of centroids may be based on the determining that the quantity of errors exceeds the error threshold.

Some examples of the method, apparatuses, and non-transitory computer-readable medium described herein may further include operations, features, means, or instructions for iteratively determining the second set of centroids may be based on a configured periodicity for determining the set of centroids.

Some cases of the method, apparatuses, and non-transitory computer-readable medium described herein may further include operations, features, means, or instructions for iteratively determining the set of centroids further includes iteratively determining the set of centroids until a number of iterations satisfies a threshold number of iterations.

Some instances of the method, apparatuses, and non-transitory computer-readable medium described herein may further include operations, features, means, or instructions for converting the optical signal to an electrical signal, and sampling the electrical signal to generate a digital signal, where the iteratively determining the set of centroids may be based on the digital signal.

An apparatus is described. The apparatus may include a transceiver configured to receive, from a transmitter, an optical signal including a set of data symbols and a demodulator configured to iteratively determine a set of centroids for demodulating the set of data symbols according to a modulation constellation associated with the set of data symbols, where the iteratively determining includes, for each data symbol of at least a subset of the set of data symbols, assigning a centroid of the set of centroids to the each data symbol of at least the subset of the set of data symbols, updating one or more of the set of centroids based on the assigning the centroid to the each data symbol of at least the subset of the set of data symbols, and demodulating the set of data symbols based on the updated set of centroids.

In some examples, the transceiver may be further configured to convert the optical signal to an electrical signal.

Some examples of the apparatus may further include an analog-to-digital (ADC) converter configured to receive, from the transceiver, the electrical signal, and sample the electrical signal to generate a digital signal, where the iteratively determining the set of centroids may be based on the digital signal.

A method is described. The method may include receiving an optical signal including a set of data symbols, performing a training procedure to update an initial set of centroids until a convergence metric associated with an updated set of centroids satisfies a threshold. Performing the training procedure may include, for each data symbol of at least a subset of the set of data symbols, assigning a centroid of the initial set of centroids to the each data symbol of the at least the subset of the set of data symbols, updating one or more of the initial set of centroids to generate one or more updated centroids based on the assigning the centroid to the each data symbol of at least the subset of the set of data symbols, and monitoring the convergence metric associated with the updated set of centroids, the convergence metric based on a difference between the one or more updated centroids for a first iteration and for a second iteration. The method may further include classifying, after performing the training procedure, the each of the set of data symbols according to the updated set of centroids, and demodulating the set of data symbols based on the classifying the each of the set of data symbols.

An apparatus is described. The apparatus may include a processor, memory in electronic communication with the processor, and instructions stored in the memory. The instructions may be executable by the processor to cause the apparatus to receive an optical signal including a set of data symbols, perform a training procedure to update an initial set of centroids until a convergence metric associated with an updated set of centroids satisfies a threshold. Performing the training procedure may include, for each data symbol of at least a subset of the set of data symbols, assigning a centroid of the initial set of centroids to the each data symbol of the at least the subset of the set of data symbols, updating one or more of the initial set of centroids to generate one or more updated centroids based on the assigning the centroid to the each data symbol of at least the subset of the set of data symbols, and monitoring the convergence metric associated with the updated set of centroids, the convergence metric based on a difference between the one or more updated centroids for a first iteration and for a second iteration. The instructions may be further executable to cause the apparatus to classify, after performing the training procedure, the each of the set of data symbols according to the updated set of centroids, and demodulate the set of data symbols based on the classifying the each of the set of data symbols.

Another apparatus is described. The apparatus may include means for receiving an optical signal including a set of data symbols, means for performing a training procedure to update an initial set of centroids until a convergence metric associated with an updated set of centroids satisfies a threshold. Performing the training procedure may include, for each data symbol of at least a subset of the set of data symbols, assigning a centroid of the initial set of centroids to the each data symbol of the at least the subset of the set of data symbols, updating one or more of the initial set of centroids to generate one or more updated centroids based on the assigning the centroid to the each data symbol of at least the subset of the set of data symbols, and monitoring the convergence metric associated with the updated set of centroids, the convergence metric based on a difference between the one or more updated centroids for a first iteration and for a second iteration. The apparatus may further include means for classifying, after performing the training procedure, the each of the set of data symbols according to the updated set of centroids, and demodulating the set of data symbols based on the classifying the each of the set of data symbols.

A non-transitory computer-readable medium storing code is described. The code may include instructions executable by a processor to receive an optical signal including a set of data symbols, perform a training procedure to update an initial set of centroids until a convergence metric associated with an updated set of centroids satisfies a threshold. Performing the training procedure may include, for each data symbol of at least a subset of the set of data symbols, assigning a centroid of the initial set of centroids to the each data symbol of the at least the subset of the set of data symbols, updating one or more of the initial set of centroids to generate one or more updated centroids based on the assigning the centroid to the each data symbol of at least the subset of the set of data symbols, and monitoring the convergence metric associated with the updated set of centroids, the convergence metric based on a difference between the one or more updated centroids for a first iteration and for a second iteration. The code may further include instructions executable by the processor to classify, after performing the training procedure, the each of the set of data symbols according to the updated set of centroids, and demodulate the set of data symbols based on the classifying the each of the set of data symbols.

Some examples of the method, apparatuses, and non-transitory computer-readable medium described herein may further include operations, features, means, or instructions for performing a second training procedure to determine a second set of centroids after demodulating the set of data symbols, where the performing the second training procedure may be based on a signal to noise ratio of the optical signal, a detected number of errors based on the demodulating the set of data symbols, a configured periodicity, or a combination thereof.

In some examples of the method, apparatuses, and non-transitory computer-readable medium described herein, monitoring the convergence metric further may include operations, features, means, or instructions for comparing a first difference between the one or more updated centroids for the first iteration and for the second iteration with a second difference between the one or more updated centroids for a third iteration and for a fourth iteration, and determining the convergence metric based on a difference between the first difference and the second difference.

DETAILED DESCRIPTION

Figure 1:
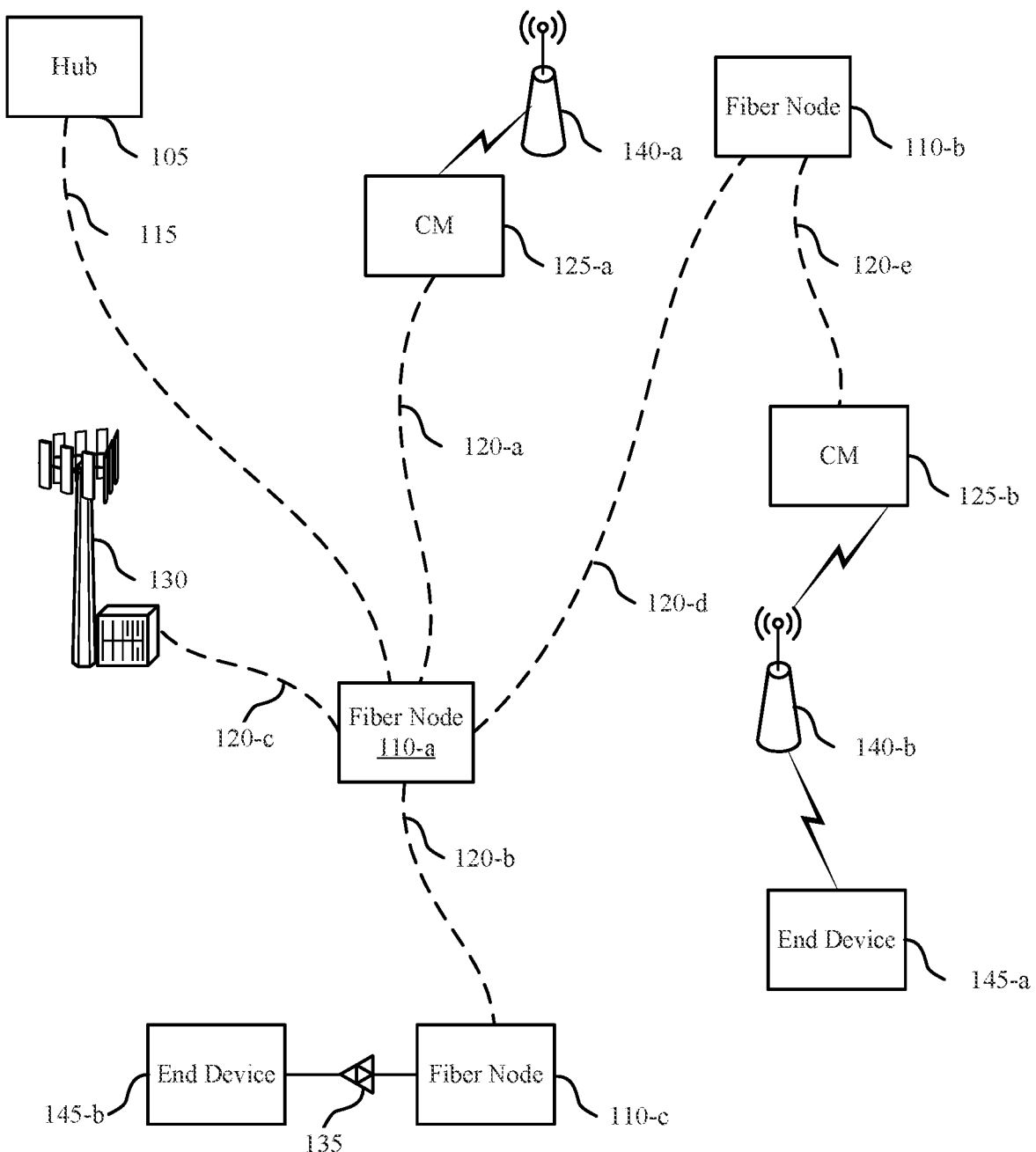
FIG. 1 illustrates an example of a communication system in accordance with aspects of the present disclosure.

Network devices may communicate information over physical network infrastructure such as fiber optics using a modulation scheme, for example a quadrature amplitude modulation (QAM) scheme. A receiving device (e.g., a receiver) may receive the signal and perform coherent digital signal processing (DSP) in order to recover the signal. The DSP algorithm may include determining a set of centroids associated with the received signal and classifying each data symbol of the received signal according to the set of centroids. In some cases, the set of centroids may be static, or preconfigured. However, the signal may include nonlinear distortions (e.g., incurred by electrical amplification, nonlinearities of a fiber optic network). According to various aspects, the DSP algorithm may implement a feedback loop to determine and update the set of centroids based on the received signal.

The receiving device may receive the signal (e.g., an optical signal by a fiber optic network) and perform a training procedure to determine the set of centroids. The training procedure may be based on an initial set of centroids. The initial set of centroids may be a configured set of initial centroids (e.g., indicated to the receiving device). Additionally or alternatively, the receiving device may determine the initial set of centroids based on receiving the signal. For example, the receiving device may partition the radiuses of a set of symbols into different clusters to generate the initial set of centroids (e.g., based on the radiuses associated with the different clusters).

To execute the training procedure, the receiving device may assign a centroid (e.g., of the initial set of centroids) to a first data symbol within the signal and then update the initial set of centroids based on the first data symbol. The receiving device may then assign a centroid (e.g., of the updated initial set of centroids) to a second data symbol within the signal and then update the initial set of centroids again. The receiving device may continue to iteratively update the set of centroids based on assigning a centroid to a data symbol for the duration of the training procedure. The duration of the training procedure (e.g., corresponding to a number of data symbols being used to iteratively update the set of centroids) may be preconfigured. Additionally or alternatively, the duration of the training procedure may be based on a convergence of the set of centroids. Once the training procedure is completed, the receiving device may assign centroids to each of the data symbols within the signal and demodulate the signal based on the assigned centroids. By implementing the feedback loop during the training procedure, the DSP algorithm may decrease the effects of nonlinear distortions on the signal and may increase the accuracy and reliability of communications within the system.

Features of the disclosure are initially described in the context of a communication system as described with reference to FIG. 1. Features of the disclosure are further described in the context of block diagrams, process flows, and a distribution as described with reference to FIGS. 3-8. These and other features of the disclosure are further illustrated by and described with reference to apparatus diagrams, system diagrams, and flowcharts that relate a decision directed multi-modulus searching algorithm.

FIG. 1 illustrates an example of a communication system 200 that supports methods for network maintenance in accordance with aspects of the present disclosure. The communication system 100 may include hub 105, fiber nodes 110, CMs 125, a base station 130, APs 140, and end devices 145. Hub 105 may be an optical hub 105 that is, for example, a central office, a communications hub, or an optical line terminal (OLT). In the example shown, fiber node 110 is illustrated for use with an optical network, such as but not limited to a passive optical network (PON) and its variants. End devices 145 may be downstream termination units, which can represent, for example, a customer device, customer premises (e.g., an apartment building), a business user, or an optical network unit (ONU). Base station 130 is shown as a larger wireless station, such as a macro cell, but may equally, optionally, or additionally include one or more small cells, micro cells, picocells, femtocell, and other versions of radio heads and remote radio heads including split, virtualized, and virtualized radio units. APs 140 may be different types of APs (e.g., for metropolitan areas, home networks, etc.). The APs 140 may communicate according to the wireless local area network (WLAN) radio and baseband protocol for physical and media access control (MAC) layers from Institute of Electrical and Electronics Engineers (IEEE) 802.11 and versions including, but not limited to, 802.11b, 802.11g, 802.11a, 802.11n, 802.11ac, 802.11ad, 802.11ah, 802.11ax, etc.

Hub 105 may communicate with fiber node 110-a by way of optical fiber bundle 115. Optical fiber bundle 115 may be used to communicate both downstream communications to fiber node 110-a and upstream communications from fiber node 110-a to hub 105. In operation, optical fiber bundle 115 may be 30 km or shorter. However, the optical fiber bundle 115 may be longer, such as between 100 km and 1000 km. In some cases, optical fiber bundle 115 may include only a single fiber or a few individual fibers (e.g., six). In some examples, fiber node 110-a may connect with other devices by optical fibers 120 (e.g., optical fiber 120-a, optical fiber 120-b, optical fiber 120-c, etc.). For example, fiber node 110-a may connect with CM 125-a by optical fiber 120-a and fiber nodes 110-b and 110-c by optical fibers 120-d and 120-b respectively. In some cases, fiber node 110-a and CM 125-a may be integrated as a single device, such as a cable modem termination system (CMTS), which may be located at or near a customer premises. In cases when the fiber node 110-a and other devices (e.g., CM 125-a, fiber nodes 110-b, 110-c, base station 130) are separate devices, optical fibers 120 may span distances of approximately 5000 feet or less, although this may vary depending on the network. The communication system 100 may correspond to an optical service domain group. The optical service domain group may correspond to a group of devices routing communications through fiber node 110-a.

Fiber node 110-a may be configured to multiplex and aggregate services over fiber access networks, such as but not limited to a cable access network and other access networks. For example, fiber node 110-a may receive downstream communications and direct the downstream communications by optical fibers 120 to one or more of the devices (e.g., CMs 125, fiber nodes 110, base station 130, end devices 145). The downstream communications may carry DOCSIS channels, digital video, analog video channels, channels with telemetry information, set top box control channels, internet protocol (IP) protocol data, over-the-top data, telephony channels, and any other data that may be carried over digital and analog networks. In another example, communication system 100 may include EPON services, radio frequency over glass (RFOG) services, in combination with other services.

Fiber node 110-a may receive and aggregate upstream communications from CM 125-a, fiber nodes 110-b, or base station 130. The upstream communications may include DOCSIS channels, set top box return channels, upstream telemetry, and telephony channels. The upstream communications may also include EPON, GPON, RFOG, and Gigabit Ethernet. In some cases, the channels may be multiplexed and a wideband composite signal may be used to intensity modulate an optical carrier (e.g., by an CM 125). The fiber node 110-a may combine the upstream signals and communicate them to hub 105. Fiber node 110-a may direct communications to other fiber nodes 110. For example, the fiber node 110-a may receive downstream communications from hub 105 and direct the communications to other fiber nodes 110 (e.g., fiber nodes 110-b and 110-c). Here, the receiving fiber nodes 110-b and 110-c may in turn receive the downstream communications from fiber node 110-a and direct the communications accordingly. For example, fiber node 110-b may receive downstream communications from fiber node 110-a and direct the communications to CM 125-b by fiber 120-e. Further, fiber node 110-b may receive and aggregate upstream communications from CM 125-b (and any additional CMs 125 in communication with 110-b) and fiber node 110-b may direct the upstream communications to fiber node 110-a. In some examples, CMs 125 may be located at homes, businesses, and so forth.

The communication system 100 may be or may include a hybrid fiber-coaxial (HFC) network. An HFC network may include both optical fibers 120 and coaxial cables. In a case when communication system 100 includes coaxial cables, fiber nodes 110 may receive and direct communications by optical fibers and coaxial cables. For example, fiber node 110-c may receive downstream communications from fiber node 110-a by optical fiber 120-b and direct the downstream communications by coaxial cables to CMs 125-d and 125-e. The communication system 100 may include one or more radio frequency (RF) amplifiers 135. The RF amplifiers 135 may be used to amplify signals being communicated by a coaxial cable. For example, RF amplifier 135 may be used to amplify a signal between fiber node 110-c and end device 145-b. In some cases, a number or placement of RF amplifiers 135 may be based on a number of factors such as a length of coaxial cable, a type of signal being communicated on the coaxial cable, or an amount of noise associated with the signals being communicated on the coaxial cable.

Fiber node 110-a may be configured to direct communications for multiple industries. That is, fiber node 110-a may direct optical communications as well as wireless communications. For example, fiber node 110-a may connect base station 130 to a backhaul network (e.g., establish a wired communication between the base station 130 and the hub 105) by optical fiber 120-c. Alternatively, fiber node 110-a may connect base station 130 to a fronthaul, mid-haul or x-haul network, depending on the network configuration and/or coupling. Base station 130 has been included for explanatory purposes only and communication system 100 may include one or more base stations 130 or no base stations.

Communication system 100 may be used for point-to-point optical link based services, such as Gigabit Ethernet (e.g., used to support business services) by an AP 140. Here, an AP 140 may be in communication with a CM 125 (e.g., by Ethernet) and provide Wi-Fi connectivity for various devices. For example, the AP 140-a may be in communication with the CM 125-a and may provide Wi-Fi connectivity. Additionally or alternatively, the AP 140-a may be in communication with the CM 125-b and provide Wi-Fi connectivity to one or more end devices 145 (e.g., end device 145-a). The APs 140 may be integrated with a router (e.g., in a single device). In some other cases, the APs 140 may be in communication with the router (e.g., by Ethernet), where the router is in communication with the CM 125.

Devices within communication system 100 (e.g., hub 105, fiber nodes 110, CMs 125) may receive optical signals and perform coherent DSP in order to recover a signal. The DSP algorithm may include determining a set of centroids associated with the received signal and classifying each data symbol of the received signal according to the set of centroids. In some cases, the set of centroids may be static, or preconfigured. However, the signal may include nonlinear distortions (e.g., incurred by electrical amplification, non-linearities of a fiber optic network). According to various aspects, the DSP algorithm may implement a feedback loop to determine and update the set of centroids based on the receive signal.

The receiving device may receive the signal and perform a training procedure to determine the set of centroids. The training procedure may include the receiving device assigning a centroid (e.g., of an initial set of centroids) to a first data symbol within the signal and then updating the initial set of centroids based on the first data symbol. The receiving device may then assign a centroid (e.g., of the updated initial set of centroids) to a second data symbol within the signal and then update the initial set of centroids again. The receiving device may continue to iteratively update the set of centroids based on assigning a centroid to a data symbol for the duration of the training procedure. Once the training procedure is completed, the receiving device may assign centroids to each of the data symbols within the signal and demodulate the signal based on the assigned centroids. By implementing the feedback loop during the training procedure, the DSP algorithm may decrease the effects of nonlinear distortions on the signal to increase the accuracy and reliability of communications within the system.

Figure 2:
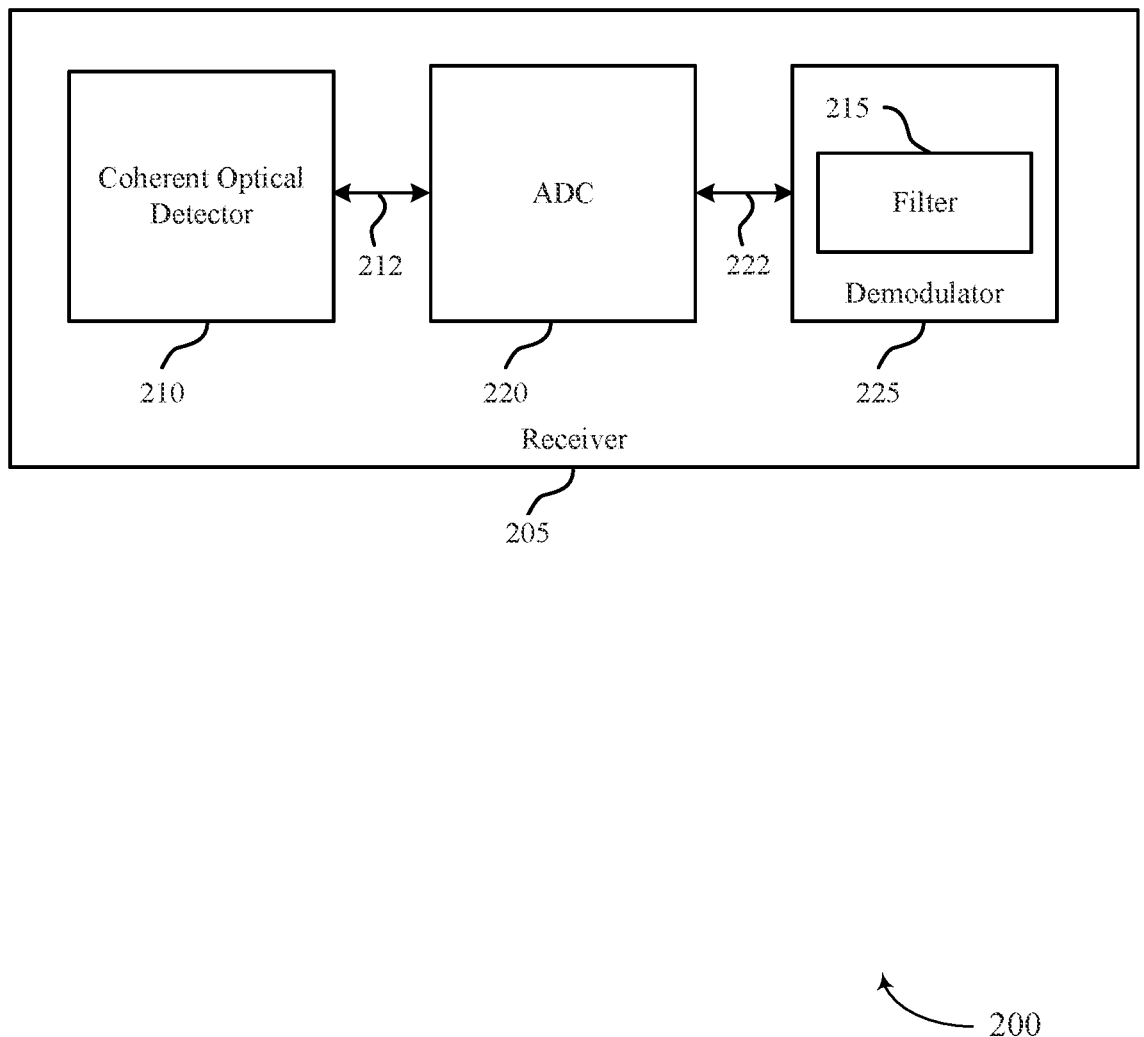
FIGS. 2 and 3 illustrate a block diagrams of devices in accordance with aspects of the present disclosure.

FIG. 2 illustrates an example of a block diagram 200 of an receiver 205 that supports decision directed multi-modulus searching algorithm in accordance with aspects of the present disclosure. In some cases, devices illustrated in FIG. 1 may include aspects of the receiver 205. For example, the hub 105, a fiber node 110, and a CM 125 may include aspects of the receiver 205. That is, devices operating within a fiber optic network may include an receiver 205. The receiver 205 may include a coherent optical detector 210, an analog-to-digital converter (ADC) 220, and a demodulator 225.

The receiver 205 may be configured to receive, by the coherent optical detector 210, a coherent optical signal. In some cases, the receiver 205 may receive an optical signal input from an optical fiber (e.g., an optical fiber 120 or optical fiber bundle 115 as described with reference to FIG. 1). For example, a transmitting device (e.g., a hub 105, a fiber node 110, a CM 125) may modulate data to generate an optical signal. The transmitting device may transmit the optical signal and the coherent optical detector 210 at the receiver 205 may receive the optical signal. The coherent optical detector 210 may include a photodetector. For example, the coherent optical detector 210 may receive the optical signal and output (e.g., to the ADC 220) an analog electrical signal 212 (e.g., generated by the photodetector).

The ADC 220 may receive the analog electrical signal 212 from the coherent optical detector 210 and generate a digital signal 222. For example, the ADC 220 may sample the analog electrical signal 212 received from the coherent optical detector 210. The sampled analog electric signal may correspond to the digital signal 222. In some cases, the coherent optical detector 210 and/or the ADC 220 may include aspects of a transceiver as described herein. The ADC 220 may output the digital signal 222 to the demodulator 225. The demodulator 225 may receive the digital signal 222 and demodulate a set of data symbols included in the digital signal 222. The demodulator 225 may demodulate the digital signal 222 by a coherent demodulation process.

First, the demodulator 225 may de-skew the digital signal 222 and perform clock recovery. For example, the ADC 220 may skew the digital signal 222 by sampling the analog electrical signal 212 (e.g., output from the coherent optical detector 210) at an irregular periodicity. The demodulator 225 may perform a skew recovery procedure to minimize the impact on signal recovery due to the skew. The demodulator 225 may communicate the digital signal 222 (e.g., after the skew and clock recovery procedures have been performed) to the filter 215.

The filter 215 may receive the digital signal 222 and perform polarization demultiplexing and equalization on the digital signal 222. The polarization demultiplexing and equalization may include the filter 215 classifying each data symbol (e.g., within the digital signal 222) according to the set of centroids. In some cases, the filter 215 may implement a multi-modulus algorithm (MMA) to classify the data symbols according to the set of centroids. The MMA algorithm may include the filter 215 determining a centroid (e.g., a ring) that is the closest radius distance to the modulus associated with the data symbols. In some cases, the filter 215 or the demodulator 225 may determine the set of centroids prior to classifying the data symbols. For example, the filter 215 or the demodulator 225 may randomly select one or more data symbols and determine the set of centroids (e.g., an initial set of centroids) based on the radii of the one or more randomly selected data symbols. The algorithm may then enable the filter 215 or the demodulator 225 to dynamically update the set of initial centroids based on classifying additional data symbols. Following the determination of the set of centroids, the filter 215 may implement the MMA to classify the data symbols within the digital signal 222.

Then, the demodulator 225 may then perform carrier frequency offset (CFO) compensation. CFO may occur in the digital signal 222 when the received signal (e.g., the optical signal received by the coherent optical detector 210) is shifted in frequency (e.g., relative to the optical signal). The demodulator 225 may compensate for the CFO in order to reduce signal-to-noise ratio degradation. After performing the CFO compensation, the demodulator 225 may perform phase recovery on the signal. The demodulator 225 may make final decisions after performing the phase recovery. Here, the demodulator 225 may extract the data symbols to determine the data included in the optical signal (e.g., received at the coherent optical detector 210).

Figure 3:
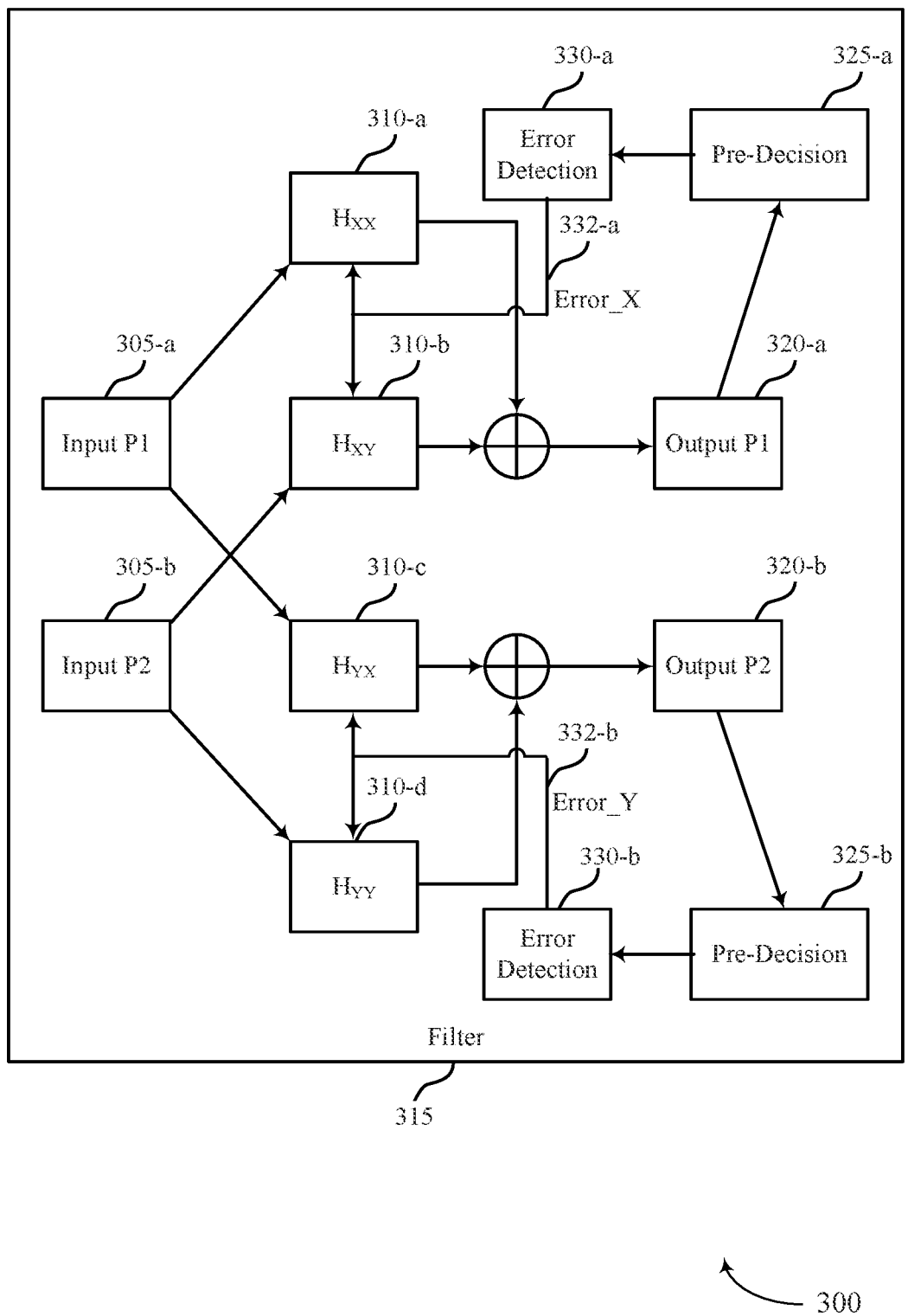

FIG. 3 illustrates an example of a block diagram 300 of a filter 315 that supports decision directed multi-modulus searching algorithm in accordance with aspects of the present disclosure. The filter 315 may be an example of the filter 215 as described with reference to FIG. 2. For example, the filter 315 may be configured to receive input P1 305-a associated with a first polarization and input P2 305-b associated with a second polarization from a demodulator. The filter 315 may perform polarization demultiplexing and channel equalization on the digital signal as part of a coherent demodulation process.

The filter 315 may be configured to implement a DSP algorithm to determine a set of centroids used to demodulate a signal (e.g., an optical signal) and subsequently classify the data symbols (e.g., within the optical signal) according to the determined set of centroids. The algorithm may set initial centroids based on a radius associated with one or more randomly selected data symbols. The algorithm may refine the initial set of centroids (e.g., update the initial set of centroids) by adjusting the set of centroids based on classifying a set of data symbols. For example, the algorithm may use a training set of data symbols (e.g., a first 100 data symbols of a 1000 data symbol signal) to iteratively adjust the set of centroids. The algorithm may classify a first data symbol according to the initial set of centroids (e.g., using a K-means algorithm), then update a location of one or more of the initial centroids based on a radius of the first data symbol. The algorithm may continue to classify symbols and update the set of centroids for the duration of the training set of data symbols.

The DSP algorithm may then proceed to classify the data symbols of the signal according to the updated set of centroids. In some cases, the DSP algorithm may use an MMA to classify the data symbols according to a set of centroids. The MMA may determine which centroid (e.g., of the updated set of centroids) has a radius that is most similar to a radius of a data symbol. The MMA may determine which centroid has the radius that is most similar to the radius of the data symbol based on a mean square error (MSE). Equation 1 illustrates an example of a calculation that can be used to calculate the MSE.

$$\text{MSE} = |R_{dec}^2 - R_s^2| \quad (1)$$

In Equation 1, the term $R_{dec}$ can refer to a radius associated with a centroid in the updated set of centroids (e.g., a pre-decided centroid ring) and $R_s$ can refer to a radius of a data symbol to be classified. The algorithm may determine which centroid to classify the data symbol with based on minimizing the MSE.

The filter 315 may be configured to compensate the channel response and demultiplex two polarization states (e.g., input P1 305-a and input P2 305-b) using the algorithm. For example, the filter 315 may use a modulus algorithm to compensate the channel response (e.g., due to nonlinearity within the channel). The modulus algorithm may be the DSP algorithm (e.g., the entire DSP algorithm, a portion of the DSP algorithm). In some cases, the filter 315 may be an example of a butterfly adaptive filter used for a constant modulus algorithm (CMA) and an MMA to recover a signal. The filter 315 may include four filters 310, each receiving a combination of the inputs 305. The filters 315 may be finite impulse response (FIR) filters, and may compensate for cross polarization effects such as polarization mode dispersion. The output of the filters 310 may be combined to generate output P1 320-a and P2 320-b. Equation 2 illustrates a relationship between the inputs 305 to the filters 310 and the outputs 320.

$$\begin{bmatrix} \text{Output } P1 \\ \text{Output } P2 \end{bmatrix} = \begin{bmatrix} H_{XX} & H_{XY} \\ H_{YX} & H_{YY} \end{bmatrix} \begin{bmatrix} \text{Input } P1 \\ \text{Input } P2 \end{bmatrix} \quad (2)$$

The outputs 320 (e.g., Output P1 320-a and Output P2 320-b) may be input to pre-decision circuitry 325. The pre-decision circuitry 325-a may determine which centroid (e.g., of the updated set of centroids) has a closest radius distance to a data symbol. Based on the output of the pre-decision circuitry 325 (e.g., a centroid of the updated set of centroids), the error detection circuitry 330 may be used to calculate an error function (e.g., a distance between a radius of the centroid assigned by the pre-decision circuitry 325 and the data symbol). In some cases, the error detection circuitry 330 may classify the data symbol (e.g., according to the updated set of centroids). The error detection circuitry 330 may output information to the filters 310. For example, error detection circuitry 330-a may receive the assigned centroid from pre-decision circuitry 325-a and output a result of a first error function for a first (e.g., X) polarization (e.g., error_X 332-a) to filters 310-a and 310-b. Similarly, error detection circuitry 330-b may receive the assigned centroid from pre-decision circuitry 325-b and output a result of a second error function for a second (e.g., Y) polarization (e.g., error_Y 332-b) to filters 310-c and 310-d. As a result, the filters 310 may adapt based on the channel response and generate output P1 320-a and output P2 320-b.

Figure 4:
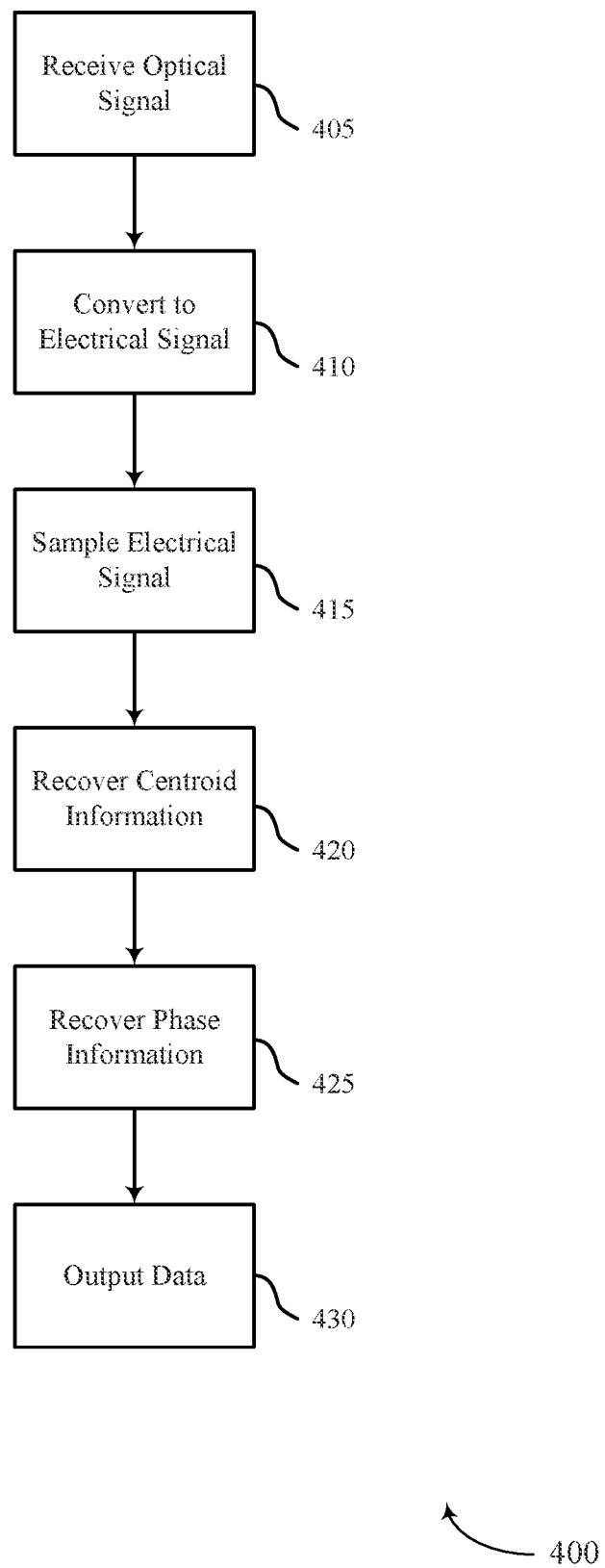
FIGS. 4 and 5 illustrate examples of process flows in accordance with aspects of the present disclosure.

FIG. 4 illustrates an example of a process flow 400 that supports decision directed multi-modulus searching algorithm in accordance with aspects of the present disclosure. The process flow 400 may include aspects of FIGS. 1 through 3. For example, the process flow 400 may include operations performed by a fiber node 110, CM 125, or hub 105 as described with reference to FIG. 1. Additionally or alternatively, the process flow 400 may include operations performed by an receiver 205 and filter 315 as described with reference to FIGS. 2 and 3.

At 405, a receiver may receive an optical signal 405. For example, a receiver of a device (e.g., a fiber node, a CM, a hub) may receive an optical signal by an optical fiber. At 410, the receiver may convert the optical signal to an electrical signal. In some cases, the receiver may convert the optical signal to the electrical signal using a photodetector.

At 415, the receiver may sample the electrical signal. In some cases, the receiver may sample the electrical signal using an ADC (e.g., ADC 220 as described with reference to FIG. 2). Sampling the electrical signal may generate a digital signal.

At 420, the receiver may recover centroid information (e.g., of the optical signal) based on the digital signal. In some cases, the receiver may recover the centroid information using a demodulator (e.g., demodulator 225 as described with reference to FIG. 2) or a filter (e.g., filter 215, filter 315, as described with reference to FIGS. 2 and 3). The device may recover centroid information by determining a set of centroids and subsequently classifying data symbols within the optical signal according to the set of centroids (e.g., assigning a centroid of the set of centroids to each data symbol). The receiver may determine the set of centroids by determining an initial set of centroids (e.g., by randomly selecting one or more data symbols, by receiving an indication of the initial set of centroids from a transmitting device) and performing a training procedure to update the set of centroids (e.g., based on a K-means algorithm). The training procedure may decrease the effects of nonlinear distortions on the optical signal to increase the accuracy and reliability of communications within the system.

At 425, the receiver may recover phase information. In some cases, the device may recover the phase information using the demodulator. At 430, based on recovering the centroid information and the phase information, the receiver may output data. For example, the data may be modulated using QAM modulation. By determining centroid and phase information associated with the signal, the receiver may determine data symbols communicated within the optical signal.

Figure 5:
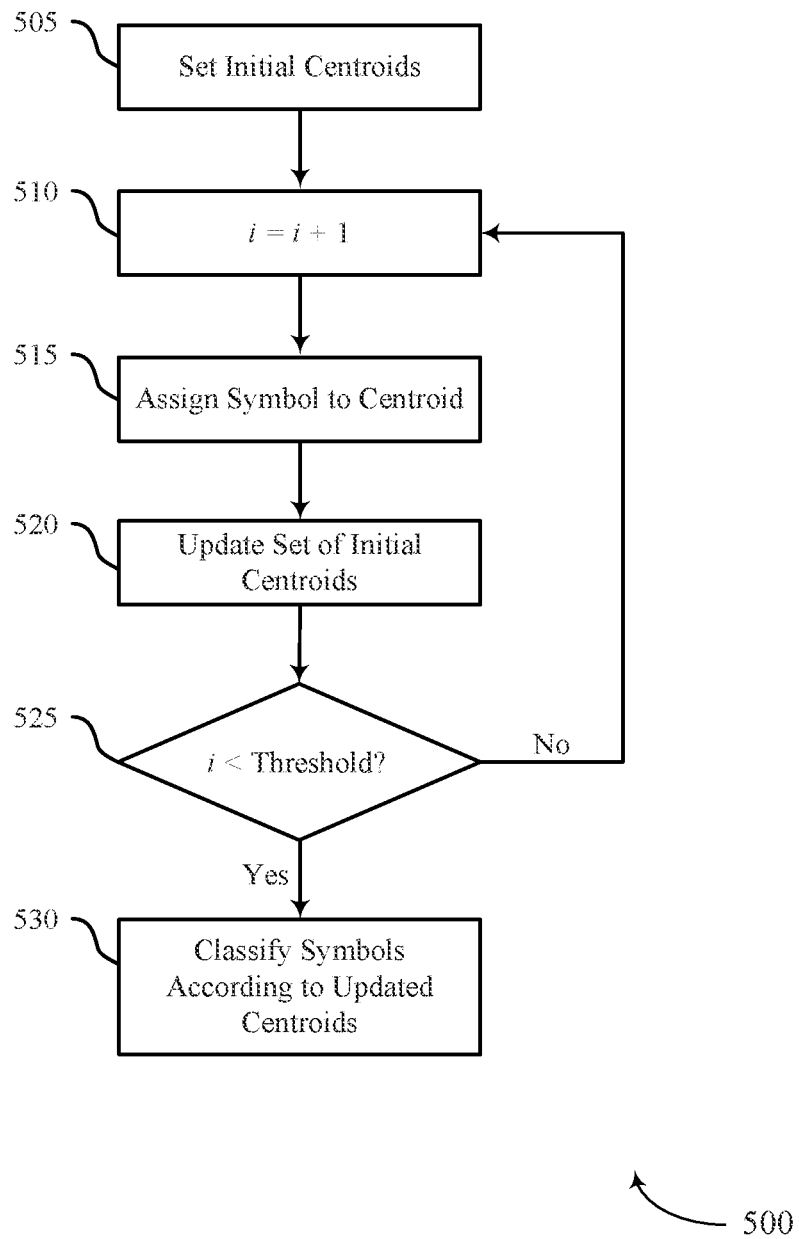

FIG. 5 illustrates an example of a process flow 500 that supports decision directed multi-modulus searching algorithm in accordance with aspects of the present disclosure. The process flow 500 may include aspects of FIGS. 1 through 4. For example, the process flow 500 may include operations performed by a receiver such as a fiber node 110, CM 125, or hub 105 as described with reference to FIG. 1. Additionally or alternatively, the process flow 500 may include operations performed by an receiver 205 and filter 315 as described with reference to FIGS. 2 and 3. In some cases, the process flow 500 may include operations performed while a receiver is recovering centroid information (e.g., as described at 420 with reference to FIG. 4).

At 505, the receiver may set the initial centroids. In some cases, a transmitting device (e.g., a device transmitting an optical signal to the receiver) may communicate an indication of the initial centroids. For example, in a case of 64 QAM, the transmitting device may indicate to the receiver a number of centroids (e.g., nine) and the receiver may determine the initial set of centroids (e.g., radii associated with the nine centroids) based on the number of centroids. In some other cases, the receiver may estimate the initial centroids from a first subset (e.g., the first M data symbols, or M data symbols out of the first L data symbols) of the data symbols. For example, the receiver may use nonhierarchical clustering (e.g., MacQueen method) by randomly assigning data symbols to a predetermined number of groups corresponding to initial centroids. Then, data symbols may be iteratively moved between groups (e.g., randomly or cyclically) and the clustering criteria evaluated to determine if the clustering criteria has converged (e.g., to a minimum value). One clustering criteria may be, for example, the determinant of a matrix of distance metrics (e.g., Euclidean distances) of the clustered data. However, other clustering criteria may be selected including sum, log, or product functions of determinants along one or more dimensions.

At 510, the receiver may increment a counter i. In some cases, i may be initialized to zero (0). Therefore, during a first iteration of performing the operation at 510, i may be incremented by one (1) so the value of the counter value i may be equal to one (1). The counter may be used to determine a duration of a training procedure. That is, after setting the initial set of centroids, the receiver may undergo a training procedure over a set of symbols to converge the position of the centroids to an optimal position.

At 515, the receiver may assign a data symbol (e.g., data symbol i) to a centroid. During a first iteration of performing the operation at 515, the receiver may assign a data symbol to a centroid of the set of initial centroids (e.g., as determined at 505). At a subsequent iteration of performing the operation at 515, the receiver may assign a data symbol to a centroid of an updated set of centroids.

The receiver may assign the data symbol to a centroid of a set of centroids (e.g., an initial set of centroids, an updated set of centroids) based on determining a difference between the radius of the data symbol and the radius of one or more of the centroids. For example, the receiver may assign the data symbol to the centroid with the smallest radius distance (e.g., a Euclidean distance) from the data symbol. Equation 3 illustrates an example of a calculation used to assign the data symbol to the centroid.

$$D_i = \min(\text{abs}(R_i - [C_1, C_2, \ldots, C_N])) \quad (3)$$

In Equation 3, the term $D_i$ may refer to the distance between the radius of the data symbol (e.g., used for the ith iteration of the training procedure) and the nearest centroid. The term $R_i$ may refer to the radius of the data symbol, and the terms C may refer to the radii of the centroids in the set of centroids. The set of centroids may include N centroids.

At 520, the receiver may update the set of initial centroids. For example, during a first iteration of performing the operation at 515, the receiver can update the set of centroids set at 505. In subsequent iterations of performing the operations at 515, the receiver can update the set of centroids previously determined at 520 (e.g., based on updating the set of centroids). The receiver may update the set of centroids based on the radius of the data symbol (e.g., classified during the previous iteration of performing the operation at 510). For example, the receiver can update the set of centroids according to Equations 4 and 5, illustrated below.

$$\Sigma k = \Sigma k + |R_i|^2, M_k = M_k + 1 \quad (4)$$

In Equation 4, the term k may refer to the index value of the centroid C that the data symbol was assigned to. Here, the term Σk can be initialized to 0 such that after a first iteration of performing the operation at 520, $\Sigma_k$ may be equal to the value of $|R_i|^2$. Further, the terms $M_k$ can also be initialized to 0.

$$c_k = \sqrt{\Sigma_k / M_k} \qquad (5)$$

In Equation 5, the term $C_k$ may refer to the updated value of the radius for centroid k of the set of centroids.

At 525, the receiver can determine if a value of the counter variable i is less than a threshold (e.g., L data symbols). In some cases, the threshold may be a preconfigured number. For example, the threshold can be set to 100 or 200, such that the receiver performs 100 or 200 iterations respectively for the training procedure (e.g., performs the operations at 510, 515, 520, and 525 100 or 200 times). If the value of the counter variable i is less than the threshold, the receiver may proceed to 530. Alternatively, if the value of the counter variable i is greater than the threshold, the receiver may proceed to 510. Thus, the receiver may set initial centroids at 505 using a first subset of data symbols of a stream of data symbols and may iteratively perform assigning of data symbols and updating of the centroids over a second subset of data symbols, where the first subset of data symbols may be a subset of the second subset of data symbols. For example, where the second subset of data symbols includes L data symbols, the first subset of data symbols may include the first M data symbols or M distributed (e.g., every Nth data symbol or randomly selected) data symbols from the L data symbols.

In some other examples, the receiver can determine the duration of the training procedure based on a convergence metric associated with the set of centroids. The convergence metric of the set of centroids may be determined based on an average distance between a data symbol radius and the radius of the nearest centroid. Here, if the average distance between the data symbol radii and the radii of the nearest centroid falls below a threshold number, the receiver may end the training procedure.

At 530, the receiver can output the set of centroids. For example, the receiver may output the set of centroids to be used for the classification of the data symbols of the optical signal. For example, the optical signal may use an MMA algorithm to classify the data symbols and determine centroid information associated with each data symbol. In some cases, the data symbols used for the training procedure may be re-classified according to the centroids output at 530.

The receiver may move from operations at 530 back to operations at 510 to re-initialize a training procedure. When performing a training procedure again (e.g., moving from operating at 530 to performing operations at 510, the set of initial centroids may correspond to the updated set of centroids determined during a previous training procedure. In some cases, the receiver may perform a training procedure according a periodicity (e.g., a preconfigured periodicity). In some other cases, the receiver may perform a training procedure based on a quality of the optical signal. For example, if an signal-to-noise-ratio of the optical signal falls below a certain threshold, the receiver may determine to perform a training procedure again. Additionally or alternatively, the receiver can determine to perform another training procedure based on a quantity of mean square errors associated with the data symbols. In a case that the detected quantity of mean square errors exceeds a threshold, the receiver may perform a second training procedure.

Figure 6:
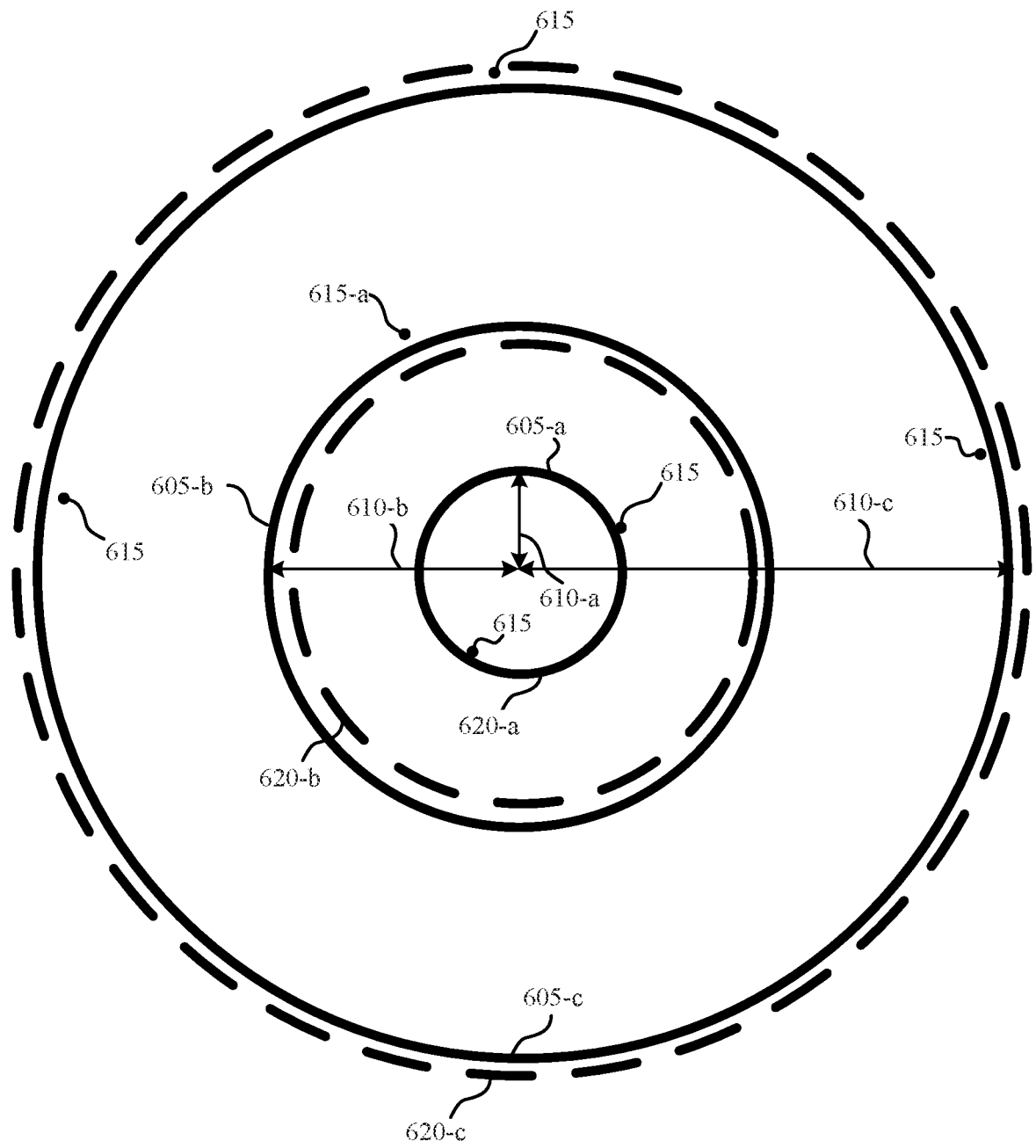
FIG. 6 illustrates an example of a centroid plot in accordance with aspects of the present disclosure.

FIG. 6 illustrates an example centroid plot 600 in accordance with aspects of the present disclosure. In some cases, the centroid plot 600 includes data symbols 615 that have been received by an receiver as described with reference to FIG. 2. In some cases, the data symbols 615 may be received by the receiver within an optical signal and converted to a digital signal (e.g., as discussed with reference to FIGS. 2 through 4).

The receiver may be initialized with initial centroids 620 (e.g., prior to receiving the optical signal or via techniques for initialization of the centroids such as nonhierarchical clustering. The receiver may perform DSP on the received optical signal to determine the updated centroids 605 and classify each of the data symbols 615. For example, the updated centroid 605-*a* may have a radius 610-*a* that is the same (or substantially the same) as an initial centroid 620-*a*, the updated centroid 605-*b* may have a radius 610-*b* that is larger than the initial centroid 620-*b*, and the updated centroid 605-*c* may have a radius 610-*c* that is smaller than the initial centroid 620-*c*. Here, the optical signal can be modulated according to a 16 QAM scheme, however in other examples, the optical signal can be modulated according to a higher QAM scheme. For higher QAM schemes, there may be a larger number of centroids 605.

The receiver can determine initial centroids 620 and begin performing a training procedure to converge a position of the updated centroids 605 (e.g., adjust the radii 610 to best fit the radii of the data symbols). Over the course of the training procedure, the initial centroids 620 may be adjusted to generate the updated centroids 605. In some cases, the optical signal including the data symbols 615 may be subject to nonlinear distortion. As a result, the adjustments made to each initial centroid 620 to generate the updated centroid 605 may not be uniform or correlated. For example, the initial centroid 620-*a* may not be adjusted to generate the updated centroid 605-*a*. That is, the data symbols assigned to the initial centroid 620-*a* may have an average radius 610-*a* that is a same radius as the initial centroid 620-*a*. The initial centroid 620-*b* may have a smaller radius than the average radius 610-*b* of the data symbols 615 assigned to the initial centroid 620-*b*. Therefore, the updated centroid 620-*b* may be larger than the initial centroid 620-*b*. The initial centroid 620-*c* may have a larger radius than the average radius 610-*c* of the data symbols 615 assigned to the initial centroid 620-*c*. Therefore, the updated centroid 620-*c* may be smaller than the initial centroid 620-*c*.

As an example, during the training procedure the receiver may classify data symbol 615-*a* (e.g., by a K-means algorithm) by calculating a Euclidean distance between the data symbol 615-*a* and one or more of centroids 605-*a*, 605-*b*, and 605-*c*. The receiver may classify the data symbol 615-*a* based on which distance is the smallest. Here, the receiver may classify the data symbol 615-*a* to the centroid 605-*b* as the distance between the data symbol 615-*a* and the centroid 605-*b* is less than the distance between the data symbol 615-*a* and the centroid 605-*a* or the distance between the data symbol 615-*a* and the centroid 605-*c*. After classifying the data symbol 615-*a* to the centroid 605-*b*, the receiver may update the radius 610-*b* of the centroid 605-*b* based on a radius of the data symbol 615-*a* (e.g., and any other data symbols 615 assigned to centroid 605-*b*). Here, the radius of the data symbol 615-*a* may be larger than the radius 610-*b*. Therefore, the radius 610-*b* of the centroid 605-*b* may be increased based on classifying the data symbol 615-*a* to the centroid 605-*b*.

Figure 7:
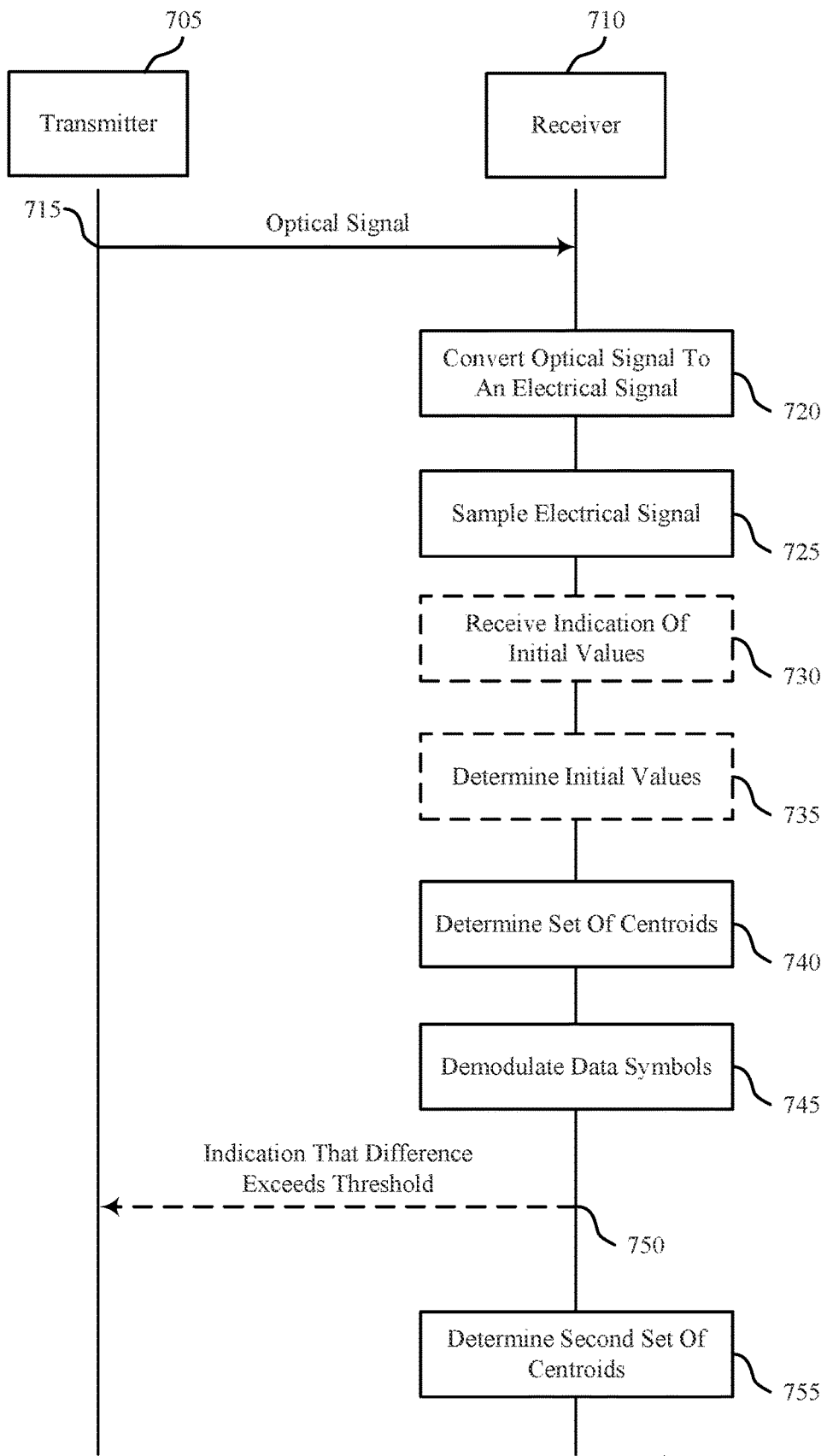
FIGS. 7 and 8 illustrate examples of process flows in accordance with aspects of the present disclosure.

FIG. 7 illustrates an example of a process flow 700 that supports a decision directed multi-modulus searching algorithm in accordance with aspects of the present disclosure. The process flow 700 may include communications performed by a transmitter 705 and a receiver 710. The transmitter 705 and the receiver 710 may be examples of a hub 105, fiber node 110, CM 125, or receiver 205 as described with reference to FIGS. 1 and 2.

At 715, the transmitter 705 may transmit an optical signal to the receiver 710. Here, the receiver 710 may receive the optical signal including a set of data symbols.

At 720, the receiver 710 may convert the optical signal to an electrical signal. For example, the receiver 710 may include a photodetector to receive the optical signal and generate an electrical signal. At 725, the receiver 710 may sample the electrical signal. For example, the receiver 710 can include an ADC that samples the electrical signal to generate a digital signal.

At 730, the receiver 710 can optionally receive an indication of initial values. For example, the receiver 710 may receive (e.g., from the transmitter 705) an indication of initial values for a set of centroids. In some cases, the receiver 710 may receive the indication prior to receiving the optical signal at 715.

At 735, the receiver 710 can optionally determine the initial values. For example, the receiver 710 can determine initial values for the set of centroids based on a value of a randomly selected data symbol At 740, the receiver 710 may determine a set of centroids based on the initial values (e.g., received at 730 or determined at 735). The receiver may iteratively determine the set of centroids for demodulating the set of data symbols according to a modulation constellation associated with the set of data symbols (e.g., as part of a training procedure). The iteratively determining can include the receiver 710 assigning a centroid of the set of centroids to each data symbol of the subset of the set of data symbols and updating one or more of the set of centroids based on the assigning the centroid to each data symbol. In some cases, the receiver 710 may determine distance metrics (e.g., Euclidean distances) between a radius of each data symbol and one or more of the centroids. The receiver 710 may assign the data symbol to the centroid based on the distance (e.g., corresponding to the centroid that is the smallest distance away from the data symbol).

At 745, the receiver 710 may demodulate the data symbols of the optical signal based on the updated set of centroids.

At 750, the receiver 710 may transmit an indication that a difference between the initial set of centroids (e.g., determined based on operations at 730 or 735) and the updated set of centroids (e.g., determined based on operations performed at 740) exceeds a threshold. In some cases, the difference exceeding the threshold may be based on a bias error.

At 755, the receiver 710 may determine a second set of centroids. For example, the receiver 710 can iteratively determine a second set of centroids based on the updated set of centroids. The receiver 710 may determine the second set of centroids based on a signal to noise ratio of the optical signal (e.g., the noise ratio exceeds a threshold), a quantity of mean square errors associated with the data symbols in the optical signal exceeds a threshold, or a periodicity for performing a training procedure.

Figure 8:
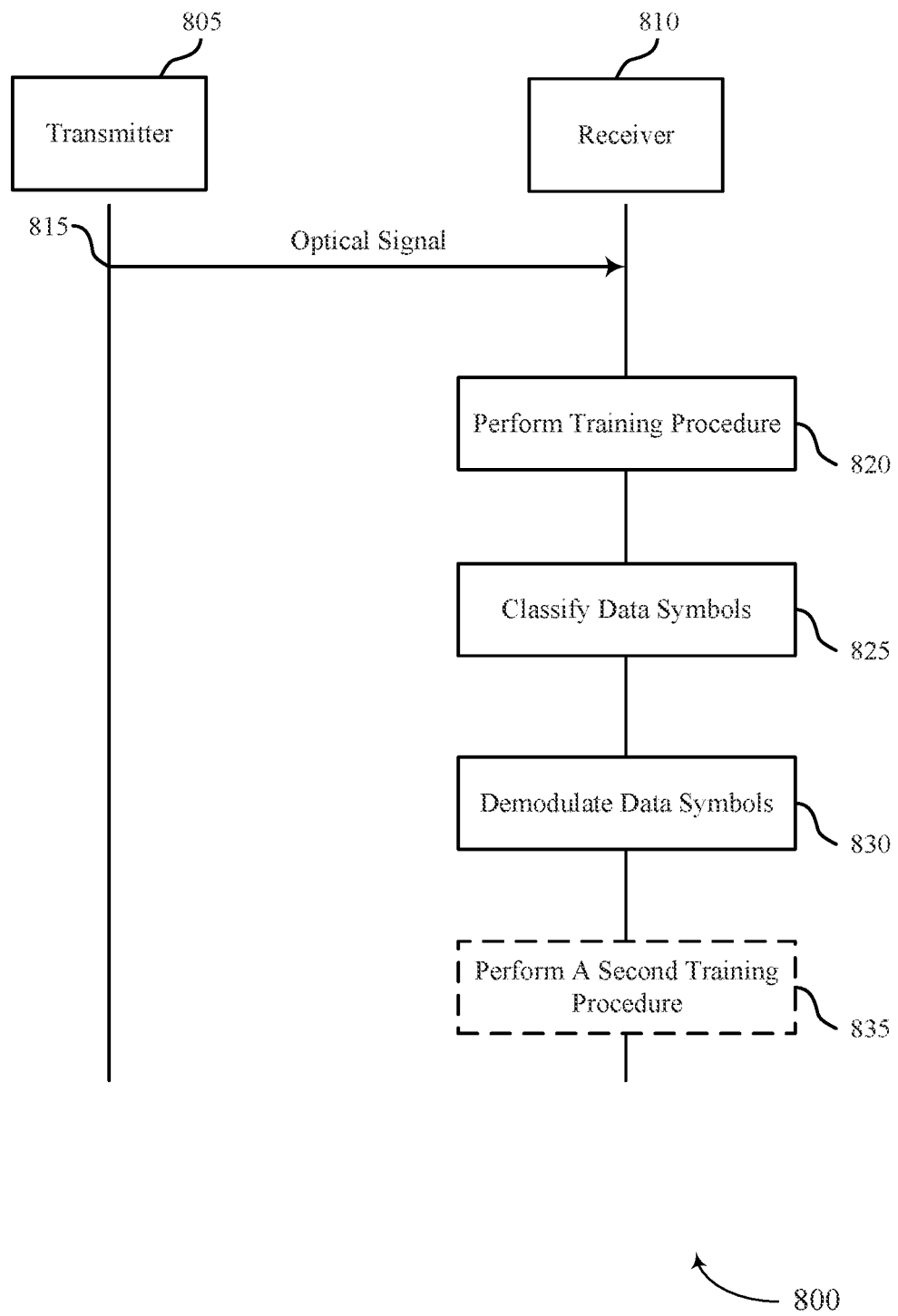

FIG. 8 illustrates an example of a process flow 800 that supports decision directed multi-modulus searching algorithm in accordance with aspects of the present disclosure. The process flow 800 may include communications performed by a transmitter 805 and a receiver 810. The transmitter 805 and the receiver 810 may be examples of a hub 105, fiber node 110, CM 125, or receiver 205 as described with reference to FIGS. 1 and 2.

At 805, the receiver 810 may receive an optical signal including a set of data symbols.

At 810, the receiver 810 may perform a training procedure to update an initial set of centroids until a convergence metric associated with an updated set of centroids satisfies a threshold. Performing the training procedure may include the receiver 810 assigning a centroid of the initial set of centroids to each data symbol and updating the initial set of centroids (e.g., to generate an updated centroid) based on assigning centroids to each data symbol. The receiver 810 may further monitor the convergence metric associated with the updated set of centroids. The convergence metric may be based on a difference between the updated centroids for a first iteration (e.g., of the training procedure) and a second iteration.

At 825, the receiver 810 may classify (e.g., after performing the training procedure) each data symbols included the optical signal according to the updated set of centroids. At 830, the receiver 810 may demodulate the data symbols based on classifying the data symbols.

At 835, the receiver 810 may perform a second training procedure to determine a second set of centroids after demodulating the set of data symbols. Performing the second training procedure may be based on a signal to noise ratio of the optical signal, a detected number of errors based at least in part on the demodulating the plurality of data symbols, a configured periodicity, or a combination thereof.

Figure 9:
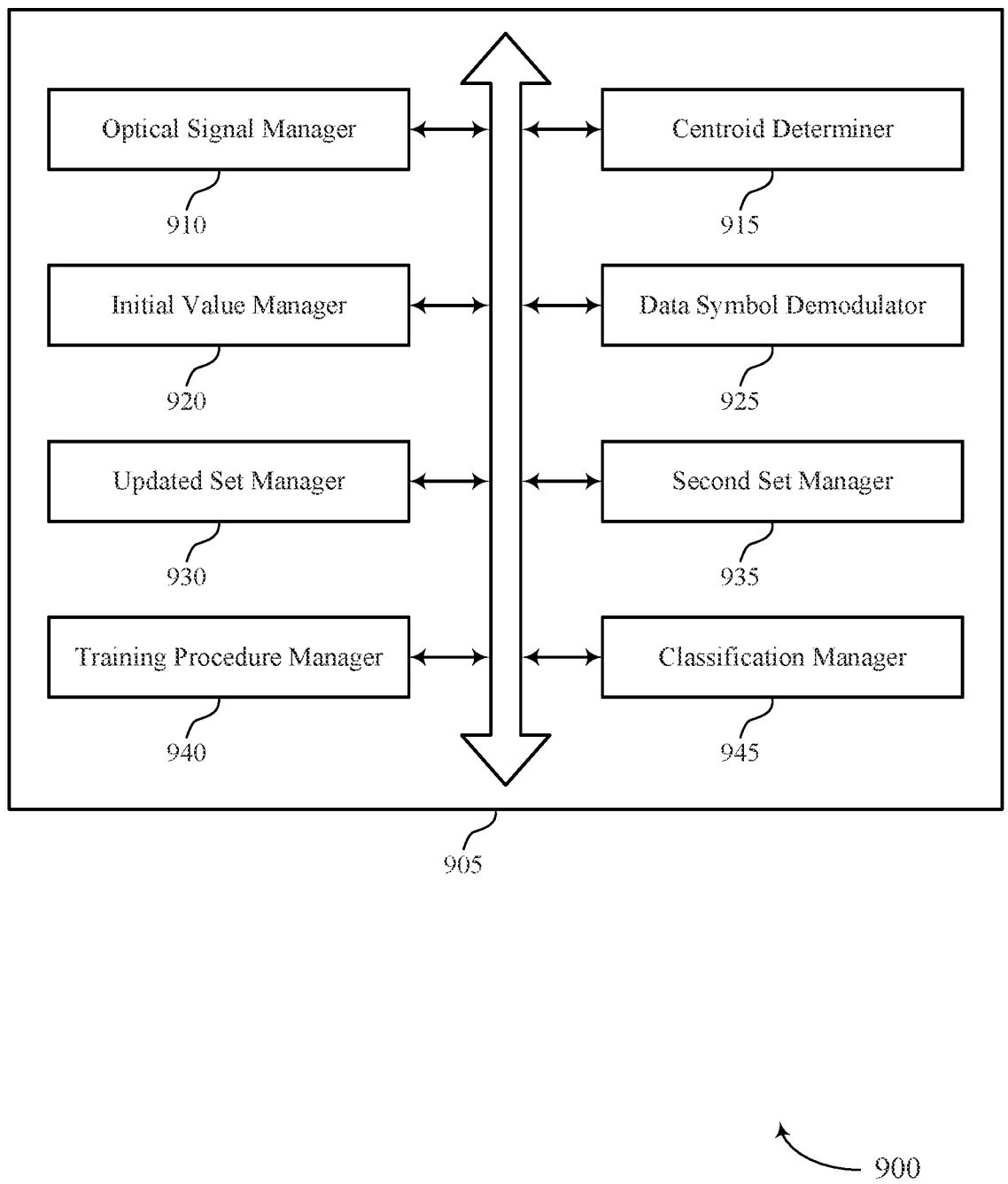
FIG. 9 shows a block diagram of a receiver that supports decision directed multi-modulus searching algorithm in accordance with aspects of the present disclosure.

FIG. 9 shows a block diagram 900 of a receiver 905 that supports decision directed multi-modulus searching algorithm in accordance with aspects of the present disclosure. The receiver 905 may be an example of aspects of a receiver as described with reference to FIG. 2 or a receiver as described with reference to FIGS. 7 and 8. The receiver 905 may include an optical signal manager 910, a centroid determiner 915, an initial value manager 920, a data symbol demodulator 925, an updated set manager 930, a second set manager 935, a training procedure manager 940, and a classification manager 945. Each of these modules may communicate, directly or indirectly, with one another (e.g., via one or more buses).

The optical signal manager 910 may receive (e.g., from a transmitter) an optical signal including a set of data symbols. In some examples, the optical signal manager 910 may convert the optical signal to an electrical signal. In some cases, the optical signal manager 910 may sample the electrical signal to generate a digital signal, where the iteratively determining the set of centroids is based on the digital signal.

The centroid determiner 915 may iteratively determine a set of centroids for demodulating the set of data symbols according to a modulation constellation associated with the set of data symbols. The iteratively determining may include, for each data symbol of at least a subset of the set of data symbols, assigning a centroid of the set of centroids to the each data symbol of at least the subset of the set of data symbols and updating one or more of the set of centroids based on the assigning the centroid to the each data symbol of at least the subset of the set of data symbols. In some examples, iteratively determining the set of centroids further includes iteratively determining the set of centroids until a number of iterations satisfies a threshold number of iterations.

In some examples, the centroid determiner 915 may determine distance metrics between a radius of the each data symbol and at least a subset of the set of centroids, where the assigning the each data symbol of the at least the subset of the set of data symbols to the centroid of the set of centroids is based on the determining the distance metrics. In some instances, the centroid determiner 915 may determine an updated centroid for the one or more of the set of centroids based on a function of radii of data symbols assigned to the one or more of the set of centroids. In some examples, the distance metrics include a minimum of a set of Euclidean distances between the radius of the each data symbol and the at least the subset of the set of centroids. In some cases, the function includes a minimizing function of Euclidean distances between the data symbols assigned to the one or more of the set of centroids and the updated centroid.

The data symbol demodulator 925 may demodulate the set of data symbols based on the updated set of centroids. In some examples, the data symbol demodulator 925 may demodulate the set of data symbols based on the classifying the each of the set of data symbols. In some cases, the data symbol demodulator 925 may assign one centroid of the updated set of centroids to each data symbol of a second subset of the set of data symbols after iteratively determining the set of centroids, where the second subset of the set of data symbols is different than the subset of the set of data symbols.

The initial value manager 920 may receive an indication of initial values for the set of centroids prior to receiving the optical signal, where the assigning the centroid is based on the initial values for the set of centroids for one or more of the at least the subset of the set of data symbols. In some examples, the initial value manager 920 may determine initial values for the set of centroids prior to the iteratively determining, where determining the initial values is based on a value of a randomly selected data symbol of the set of data symbols.

The updated set manager 930 may determine that a difference between the set of centroids and the updated set of centroids exceeds a threshold. In some examples, the updated set manager 930 may transmit an indication to the transmitter that the difference between the set of centroids and the updated set of centroids exceeds the threshold.

The training procedure manager 940 may perform a training procedure to update an initial set of centroids until a convergence metric associated with an updated set of centroids satisfies a threshold. Performing the training procedure may include, for each data symbol of at least a subset of the set of data symbols, assigning a centroid of the initial set of centroids to the each data symbol of the at least the subset of the set of data symbols, updating one or more of the initial set of centroids to generate one or more updated centroids based on the assigning the centroid to the each data symbol of at least the subset of the set of data symbols, and monitoring the convergence metric associated with the updated set of centroids. The convergence metric may be based on a difference between the one or more updated centroids for a first iteration and for a second iteration.

In some examples, the training procedure manager 940 may perform a second training procedure to determine a second set of centroids after demodulating the set of data symbols, where the performing the second training procedure is based on a signal to noise ratio of the optical signal, a detected number of errors based on the demodulating the set of data symbols, a configured periodicity, or a combination thereof. In some cases, the training procedure manager 940 may compare a first difference between the one or more updated centroids for the first iteration and for the second iteration with a second difference between the one or more updated centroids for a third iteration and for a fourth iteration. In some instances, the training procedure manager 940 may determine the convergence metric based on a difference between the first difference and the second difference.

The classification manager 945 may classify, after performing the training procedure, the each of the set of data symbols according to the updated set of centroids.

The second set manager 935 may iteratively determine, after assigning the centroid of the updated set of centroids to each data symbol of the second subset of the set of data symbols, a second set of centroids for demodulating a second set of data symbols of a second optical signal, where the iteratively determining the second set of centroids is based on the updated set of centroids. In some examples, the second set manager 935 may determine that a signal to noise ratio associated with the optical signal exceeds a noise threshold, where the iteratively determining the second set of centroids is based on the determining that the signal to noise ratio exceeds the noise threshold. In some cases, the second set manager 935 may detect a quantity of mean square errors associated with the set of data symbols based on demodulating the set of data symbols. In some instances, the second set manager 935 may determine that the quantity of mean square errors exceeds an error threshold, where the iteratively determining the second set of centroids is based on the determining that the quantity of errors exceeds the error threshold. In some examples, the second set manager 935 may iteratively determine the second set of centroids is based on a configured periodicity for determining the set of centroids.

In some examples, the data symbol demodulator 925 may demodulate the second set of data symbols based on the second set of centroids.

Figure 10:
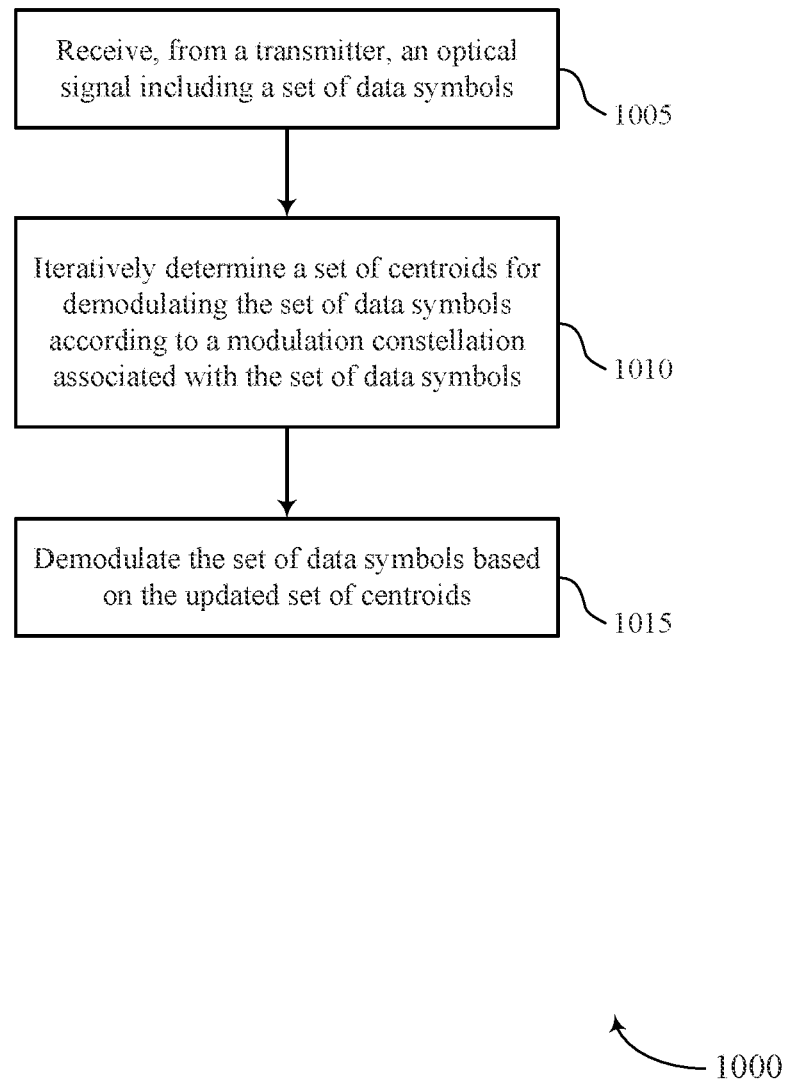
FIGS. 10 through 13 show flowcharts illustrating methods that support decision directed multi-modulus searching algorithm in accordance with aspects of the present disclosure.

FIG. 10 shows a flowchart illustrating a method 1000 that supports decision directed multi-modulus searching algorithm in accordance with aspects of the present disclosure. The operations of method 1000 may be implemented by a receiver or its components as described herein. In some examples, a receiver may execute a set of instructions to control the functional elements of the receiver to perform the described functions. Additionally or alternatively, a receiver may perform aspects of the described functions using special-purpose hardware.

At 1005, the receiver may receive, from a transmitter, an optical signal including a set of data symbols. The operations of 1005 may be performed according to the methods described herein. In some examples, aspects of the operations of 1005 may be performed by an optical signal manager as described with reference to FIG. 9.

At 1010, the receiver may iteratively determine a set of centroids for demodulating the set of data symbols according to a modulation constellation associated with the set of data symbols. The iteratively determining may include, for each data symbol of at least a subset of the set of data symbols, assigning a centroid of a set of centroids to the each data symbol of at least the subset of the set of data symbols, and updating one or more of the set of centroids based on the assigning the centroid to the each data symbol of at least the subset of the plurality of data symbols where the iteratively determining includes, for each data symbol of at least a subset of the set of data symbols. The operations of 1010 may be performed according to the methods described herein. In some examples, aspects of the operations of 1010 may be performed by a centroid determiner as described with reference to FIG. 9.

At 1015, the receiver may demodulate the set of data symbols based on the updated set of centroids. The operations of 1015 may be performed according to the methods described herein. In some examples, aspects of the operations of 1015 may be performed by a data symbol demodulator as described with reference to FIG. 9.

Figure 11:
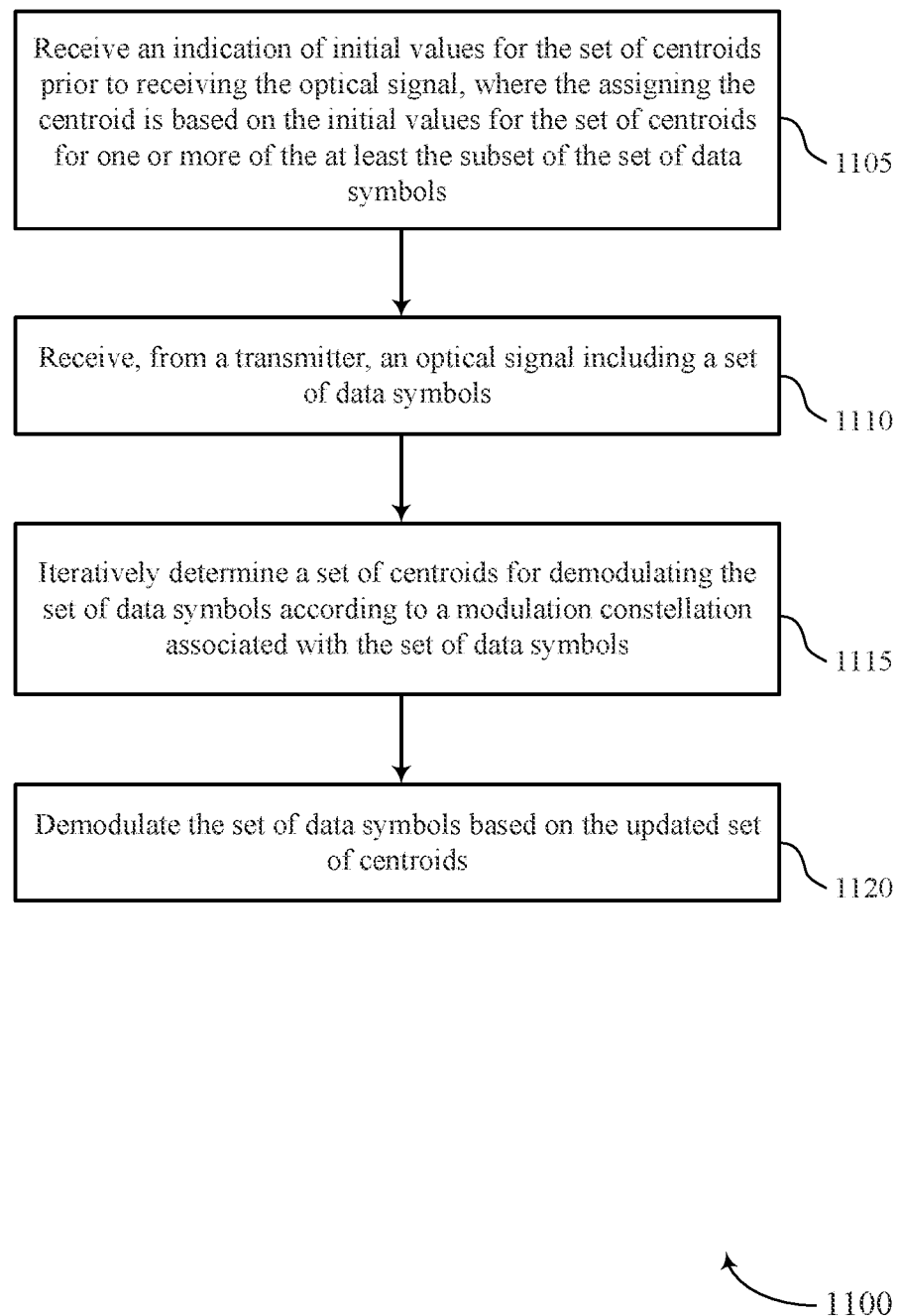

FIG. 11 shows a flowchart illustrating a method 1100 that supports decision directed multi-modulus searching algorithm in accordance with aspects of the present disclosure. The operations of method 1100 may be implemented by a receiver or its components as described herein. In some examples, a receiver may execute a set of instructions to control the functional elements of the receiver to perform the described functions. Additionally or alternatively, a receiver may perform aspects of the described functions using special-purpose hardware.

At 1105, the receiver may receive an indication of initial values for the set of centroids prior to receiving the optical signal, where the assigning the centroid is based on the initial values for the set of centroids for one or more of the at least the subset of the set of data symbols. The operations of 1105 may be performed according to the methods described herein. In some examples, aspects of the operations of 1105 may be performed by an initial value as described with reference to FIG. 9.

At 1110, the receiver may receive, from a transmitter, an optical signal including a set of data symbols. The operations of 1110 may be performed according to the methods described herein. In some examples, aspects of the operations of 1110 may be performed by an optical signal manager as described with reference to FIG. 9.

At 1115, the receiver may iteratively determine a set of centroids for demodulating the set of data symbols according to a modulation constellation associated with the set of data symbols. The iteratively determining may include, for each data symbol of at least a subset of the set of data symbols, assigning a centroid of a set of centroids to the each data symbol of at least the subset of the set of data symbols, and updating one or more of the set of centroids based on the assigning the centroid to the each data symbol of at least the subset of the plurality of data symbols where the iteratively determining includes, for each data symbol of at least a subset of the set of data symbols. The operations of 1115 may be performed according to the methods described herein. In some examples, aspects of the operations of 1115 may be performed by a centroid determiner as described with reference to FIG. 9.

At 1120, the receiver may demodulate the set of data symbols based on the updated set of centroids. The operations of 1120 may be performed according to the methods described herein. In some examples, aspects of the operations of 1120 may be performed by a data symbol demodulator as described with reference to FIG. 9.

Figure 12:
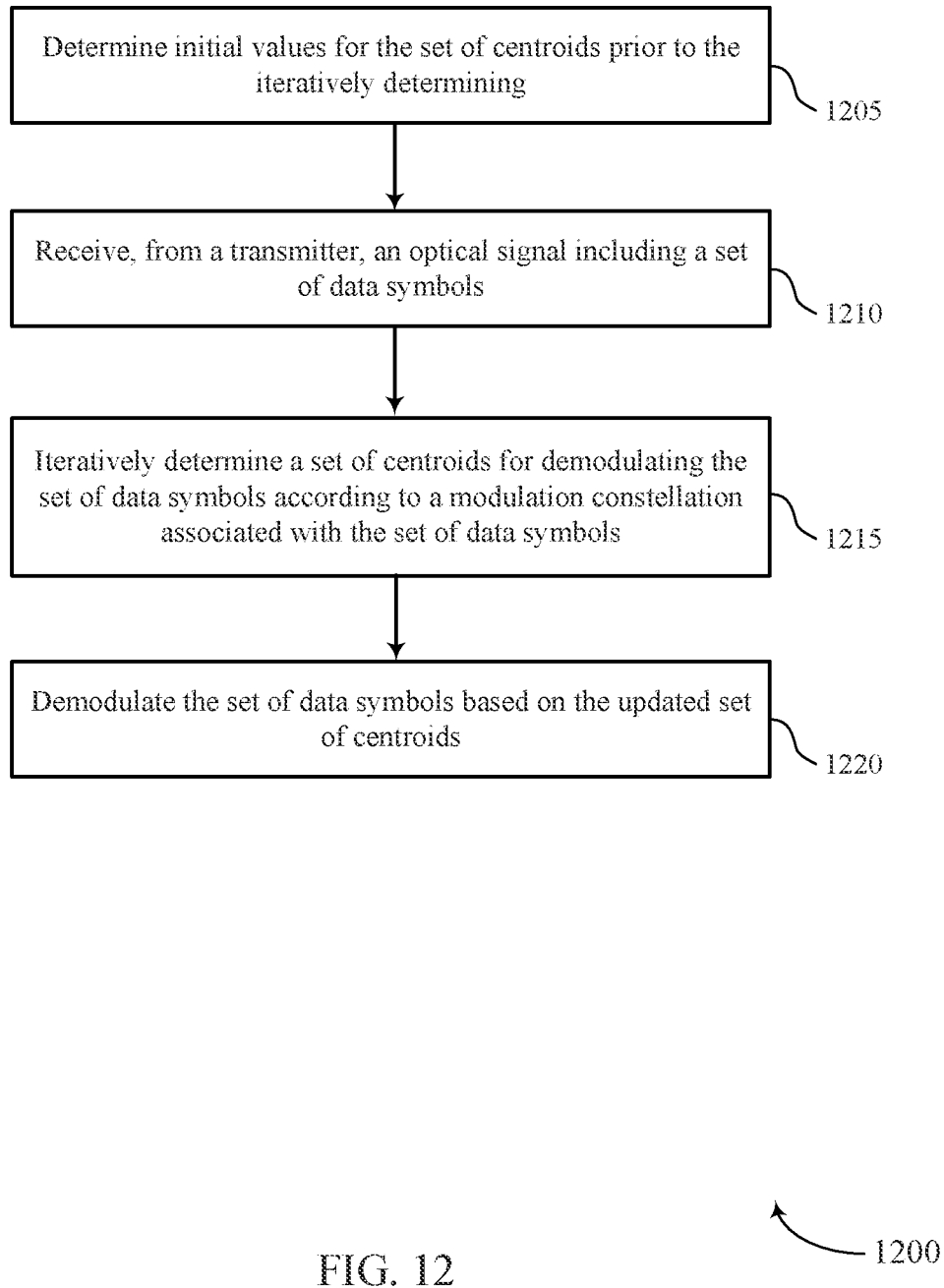

FIG. 12 shows a flowchart illustrating a method 1200 that supports decision directed multi-modulus searching algorithm in accordance with aspects of the present disclosure. The operations of method 1200 may be implemented by a receiver or its components as described herein. In some examples, a receiver may execute a set of instructions to control the functional elements of the receiver to perform the described functions. Additionally or alternatively, a receiver may perform aspects of the described functions using special-purpose hardware.

At 1205, the receiver may determine initial values for the set of centroids prior to the iteratively determining, where determining the initial values is based on a value of a randomly selected data symbol of the set of data symbols. The operations of 1205 may be performed according to the methods described herein. In some examples, aspects of the operations of 1205 may be performed by an initial value as described with reference to FIG. 9.

At 1210, the receiver may receive, from a transmitter, an optical signal including a set of data symbols. The operations of 1210 may be performed according to the methods described herein. In some examples, aspects of the operations of 1210 may be performed by an optical signal manager as described with reference to FIG. 9.

At 1215, the receiver may iteratively determine a set of centroids for demodulating the set of data symbols according to a modulation constellation associated with the set of data symbols. The iteratively determining may include, for each data symbol of at least a subset of the set of data symbols, assigning a centroid of a set of centroids to the each data symbol of at least the subset of the set of data symbols, and updating one or more of the set of centroids based on the assigning the centroid to the each data symbol of at least the subset of the plurality of data symbols where the iteratively determining includes, for each data symbol of at least a subset of the set of data symbols. The operations of 1215 may be performed according to the methods described herein. In some examples, aspects of the operations of 1215 may be performed by a centroid determiner as described with reference to FIG. 9.

At 1220, the receiver may demodulate the set of data symbols based on the updated set of centroids. The operations of 1220 may be performed according to the methods described herein. In some examples, aspects of the operations of 1220 may be performed by a data symbol demodulator as described with reference to FIG. 9.

Figure 13:
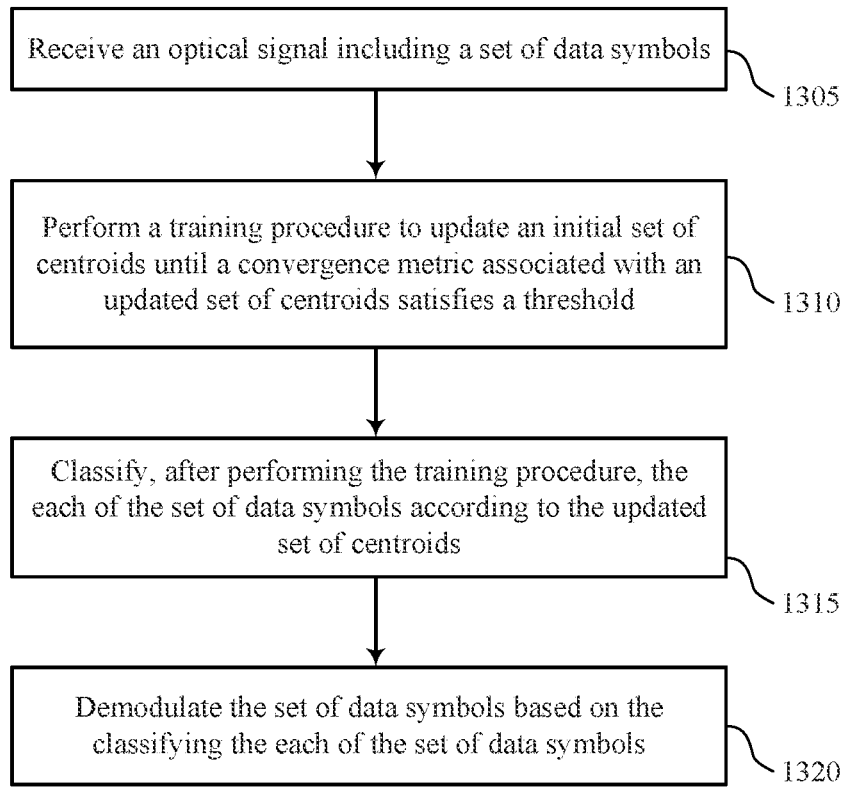

FIG. 13 shows a flowchart illustrating a method 1300 that supports decision directed multi-modulus searching algorithm in accordance with aspects of the present disclosure. The operations of method 1300 may be implemented by a receiver or its components as described herein. In some examples, a receiver may execute a set of instructions to control the functional elements of the receiver to perform the described functions. Additionally or alternatively, a receiver may perform aspects of the described functions using special-purpose hardware.

At 1305, the receiver may receive an optical signal including a set of data symbols. The operations of 1305 may be performed according to the methods described herein. In some examples, aspects of the operations of 1305 may be performed by an optical signal manager as described with reference to FIG. 9.

At 1310, the receiver may perform a training procedure to update an initial set of centroids until a convergence metric associated with an updated set of centroids satisfies a threshold. Performing the training procedure may include, for each data symbol of at least a subset of the set of data symbols, assigning a centroid of the initial set of centroids to the each data symbol of the at least the subset of the plurality of data symbols, updating one or more of the initial set of centroids to generate one or more updated centroids based at on the assigning the centroid to the each data symbol of at least the subset of the plurality of data symbols, and monitoring the convergence metric associated with the updated set of centroids. The convergence metric may be based on a difference between the one or more updated centroids for a first iteration and for a second iteration The operations of 1310 may be performed according to the methods described herein. In some examples, aspects of the operations of 1310 may be performed by a training procedure manager as described with reference to FIG. 9.

At 1315, the receiver may classify, after performing the training procedure, the each of the set of data symbols according to the updated set of centroids. The operations of 1315 may be performed according to the methods described herein. In some examples, aspects of the operations of 1315 may be performed by a classification manager as described with reference to FIG. 9.

At 1320, the receiver may demodulate the set of data symbols based on the classifying the each of the set of data symbols. The operations of 1320 may be performed according to the methods described herein. In some examples, aspects of the operations of 1320 may be performed by a data symbol demodulator as described with reference to FIG. 9.

It should be noted that the methods described herein describe possible implementations, and that the operations and the steps may be rearranged or otherwise modified and that other implementations are possible. Further, aspects from two or more of the methods may be combined.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although specific features of various embodiments of the disclosure may be shown in some drawings and not in others, this is for convenience only. In accordance with the principles of the disclosure, a particular feature shown in a drawing may be referenced and/or claimed in combination with features of the other drawings. For example, the following list of example claims represents only some of the potential combinations of elements possible from the systems and methods described herein.

The singular forms "a," "an," and "the" include plural references unless the context clearly dictates otherwise. "Optional" or "optionally" may indicate that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising steps of:
   (a) receiving, from a transmitter, a signal comprising a plurality of data symbols;
   (b) iteratively determining an initial set of centroids for demodulating the plurality of data symbols according to a modulation constellation associated with the plurality of data symbols, wherein the step of iteratively determining comprises, for each data symbol of a first subset of the plurality of data symbols, substeps of:
      (i) assigning a particular centroid of the initial set of centroids to each data symbol of the first subset of the plurality of data symbols; and
      (ii) updating one or more of the initial set of centroids, based at least in part on the assigning the particular centroid to each data symbol of the first subset of the plurality of data symbols, to generate an updated set of centroids; and
   (c) demodulating the plurality of data symbols based at least in part on the updated set of centroids,
   wherein the signal is selected from the group consisting of a wireless communication signal and a wired communication signal, and
   wherein the method further comprises at least one additional step of:
   (d) receiving an indication of initial values for the initial set of centroids prior to receiving the signal, wherein the substep of assigning the particular centroid is based at least in part on the initial values for the initial set of centroids for one or more of the first subset of the plurality of data symbols;
   (e) determining initial values for the initial set of centroids prior to the step of iteratively determining, and based at least in part on a value of a randomly selected data symbol of the plurality of data symbols;
   (f) determining distance metrics between a radius of each data symbol and at least a subset of the initial set of centroids, wherein the substep of assigning each data symbol is based at least in part on the step of determining the distance metrics;
   (g) determining an updated centroid for updated set of centroids based at least in part on a function of radii of the particular centroid assigned to the respective data symbols;
   (h) transmitting an alert to the transmitter upon determining that a difference between the initial set of centroids and the updated set of centroids exceeds a threshold; and
   (i) assigning one centroid of the updated set of centroids to each data symbol of a second subset of the plurality of data symbols after iteratively determining the initial set of centroids, wherein the second subset of the plurality of data symbols is different than the first subset of the plurality of data symbols.

2. The method of claim 1, wherein the distance metrics comprise a minimum of a plurality of Euclidean distances between a radius of each respective data symbol and the subset of the set of centroids.

3. The method of claim 1, wherein the function of radii comprises a minimizing function of Euclidean distances between the data symbols assigned to the one or more of the set of centroids and the updated centroid.

4. The method of claim 1, comprising the step of assigning one centroid of the updated set of centroids, and further comprising steps of:
   iteratively determining, after the step assigning the one centroid, a second set of centroids for demodulating a second plurality of data symbols of a second signal, wherein the step of iteratively determining the second set of centroids is based at least in part on the updated set of centroids; and
   demodulating the second plurality of data symbols based at least in part on the second set of centroids.

5. The method of claim 4, further comprising a step of:
   determining that a signal to noise ratio associated with the signal exceeds a noise threshold, wherein the step of iteratively determining the second set of centroids is based at least in part on the determining that the signal to noise ratio exceeds the noise threshold.

6. The method of claim 4, further comprising steps of:
   detecting a quantity of mean square errors associated with the plurality of data symbols based at least in part on the step of demodulating the plurality of data symbols; and
   determining that the quantity of mean square errors exceeds an error threshold, wherein the step of iteratively determining the second set of centroids is based at least in part on the determining that the quantity of errors exceeds the error threshold.

7. The method of claim 4, wherein the step of iteratively determining the second set of centroids is based at least in part on a configured periodicity for determining the set of centroids.

8. A method, comprising steps of:
   receiving a signal comprising a plurality of data symbols;
   performing a first training procedure to update an initial set of centroids until a convergence metric associated with an updated set of centroids satisfies a threshold, wherein the step of performing the training procedure comprises, for each data symbol of a subset of the plurality of data symbols, substeps of:
      assigning a centroid of the initial set of centroids to each data symbol of the subset of the plurality of data symbols;
      updating one or more of the initial set of centroids to generate one or more updated centroids based at least in part on the step of assigning the centroid to each data symbol of the subset of the plurality of data symbols; and
      monitoring the convergence metric associated with the updated set of centroids, wherein the convergence metric is based at least in part on a difference between the one or more updated centroids for a first iteration thereof and for a second iteration thereof subsequent to the first iteration;
   classifying, after the step of performing the first training procedure, each data symbol of the plurality of data symbols according to the updated set of centroids; and demodulating the plurality of data symbols based at least in part on the step of classifying each data symbol of the plurality of data symbols, wherein the signal is selected from the group consisting of a wireless communication signal and a wired communication signal.

9. The method of claim 8, further comprising a step of:

performing a second training procedure to determine a second set of centroids after demodulating the plurality of data symbols, wherein the step of performing the second training procedure is based at least in part on (i) a signal to noise ratio of the signal, (ii) a detected number of errors based at least in part on the demodulating the plurality of data symbols, and/or (iii) a configured periodicity.

10. The method of claim 8, wherein the substep of monitoring the convergence metric further comprises additional substeps of:

comparing a first difference between the one or more updated centroids for the first iteration and for the second iteration with a second difference between the one or more updated centroids for a third iteration and for a fourth iteration; and determining the convergence metric based on a difference between the first difference and the second difference.

\* \* \* \* \*